United States Patent [19]
Morton

[11] Patent Number: 6,088,783
[45] Date of Patent: Jul. 11, 2000

[54] DPS HAVING A PLURALITY OF LIKE PROCESSORS CONTROLLED IN PARALLEL BY AN INSTRUCTION WORD, AND A CONTROL PROCESSOR ALSO CONTROLLED BY THE INSTRUCTION WORD

[76] Inventor: Steven G Morton, 39 Old Good Hill Rd., Oxford, Conn. 06478

[21] Appl. No.: 09/158,208

[22] Filed: Sep. 22, 1998

Related U.S. Application Data

[63] Continuation of application No. 08/602,220, Feb. 16, 1996, Pat. No. 5,822,606.

[51] Int. Cl.[7] .................................................... G06F 15/80
[52] U.S. Cl. .............................................. 712/22; 712/203
[58] Field of Search ............................... 712/22, 203, 13, 712/215

[56] References Cited

U.S. PATENT DOCUMENTS

| | | | |
|---|---|---|---|
| 4,807,115 | 2/1989 | Torng ........................................ | 395/391 |
| 4,992,933 | 2/1991 | Taylor ....................................... | 712/22 |
| 5,313,551 | 5/1994 | Labrousse et al. ...................... | 511/149 |
| 5,353,426 | 10/1994 | Patel ......................................... | 711/118 |
| 5,465,373 | 11/1995 | Kahle et al. ............................. | 395/391 |
| 5,555,428 | 9/1996 | Radigan .................................... | 712/22 |
| 5,574,939 | 11/1996 | Keckler et al. ..................... | 395/800.24 |
| 5,655,133 | 8/1997 | Dupree et al. ...................... | 395/800.23 |
| 5,680,597 | 10/1997 | Kumar et al. ............................ | 395/567 |
| 5,682,491 | 10/1997 | Pechanek ................................. | 395/385 |
| 5,727,229 | 3/1998 | Kan .......................................... | 712/22 |

Primary Examiner—Eric Coleman
Attorney, Agent, or Firm—Harry F. Smith

[57] ABSTRACT

The Parallel DSP Chip has a general purpose, reduced instruction set for parallel digital signal processing. The following pertains to the preferred embodiment. Most instruction words are 32 bits long and execute at the rate of one per clock cycle. Each instruction word is executed by a single pipelined instruction unit that controls the operation of four, 16-bit vector processors in parallel with one group of bits, and the operation of a 24-bit scalar processor with another group of bits. Thus five instructions are typically executed for every instruction word as a result of the parallel architecture. A single, linear, 16 MB, memory address space is used, simplifying program development. The storage of 8- and 16-bit operands for use by the vector processors is supported to maximize memory utilization. The Parallel DSP Chip is specifically designed to support an enhanced C compiler and has two software stack pointers, one for the vector processors and one for the scalar processor, plus an interrupt stack pointer. The Parallel DSP Chip executes a single task in parallel. Using an enhanced C compiler, simple, familiar, scalar processing programming techniques can be used, and a simple, single-task operating system can be used for software development. The basic programming concept is to define one or more arrays of four-element structures using the enhanced C compiler. One element in such a structure is provided for each of the four vector processors. The structure to be processed at any one time is selected by an address computed by the scalar processor. The same operation is applied to all of the elements of the structure by the simultaneous operation of the vector processors. To access the next structure in an array of structures, the scalar processor advances the address by the number of bytes in the structure.

29 Claims, 12 Drawing Sheets

DPS HAVING A PLURALITY OF LIKE PROCESSORS CONTROLLED IN PARALLEL BY AN INSTRUCTION WORD, AND A CONTROL PROCESSOR ALSO CONTROLLED BY THE INSTRUCTION WORD

This application is a continuation of U.S. Ser. No. 08/602,220, filed on Feb. 16, 1996, now U.S. Pat. No. 5,822,606.

The U.S. Government may have certain limited rights to this patent because portions of this technology were developed under contract #DAAB07-93-C-U273 from the U.S. Army under the Small Business Innovation Research (SBIR) Program.

1. FIELD OF THE INVENTION

The invention relates generally to a semiconductor device designed for the processing of data in a parallel fashion to improve the rate at which the data is processed. It also relates to the design of software development tools that facilitate the programming of the device, and the method by which data is represented in the tools and handled in the device to facilitate such programming.

2. BACKGROUND OF THE INVENTION 2.1 Applications of the Invention

The invention is primarily intended to assist in the handling and processing of large amounts of numeric data in real time at low cost, while consuming a minimum of power and occupying a minimum of space. Such applications generally fall under the category of real time digital signal processing. The applications generally include image and video processing, pattern recognition, multimedia, and audio processing. In addition, many applications, such as communications, also can benefit from the high rate of data handling and processing provided by the invention.

2.2 Microprocessor Chips

Microprocessor chips, such as the large family of x86 chips from Intel, are generally intended for the processing of data in desk-top computing applications. While high processing speed is desirable to minimize the amount of time that the user spends waiting to obtain a result, the processing is generally not in real time because live data sources and sinks are generally not present. Much of the data is character oriented, such as for word processing, although the ability to process large amounts of numerical data in floating-point format for scientific and engineering applications is provided in the most recent microprocessor chips. Additional chips are required to facilitate the transferal of data from input, output and storage devices to the microprocessor chip. In addition, since the microprocessor chips must support vast numbers of software applications that were created many years ago, the chip architectures are intended for creation of applications that process a single datum at a time.

Methods for improving the performance of processors include the use of the Reduced Instruction Set Computer (RISC) design philosophy, the use of the Super Scalar architecture, and the use of the Very Large Instruction Word (VLIW) architecture.

With the RISC philosophy, the chip architect attempts to minimize the amount of circuitry required to build the chip while maximizing the speed at which that relatively small amount of circuitry operates. One usual consequence of this approach is that the software tools that prepare programs for execution on the chip must be intimately aware of the allowable flows of operations in the chip and exclude sequences of instructions that cannot be executed correctly by modifying the sequences. Previously, hardware in the chip was required to detect invalid sequences and temporarily suspend operation until the potential for invalid operation had passed.

With the Super Scalar and Very Large Instruction Word architectures, the processor architect observes that some portions of some adjacent, generally dissimilar, sequences of operations can be executed simultaneously while proving proper program function. The instruction set of the processor, and the amount of hardware in the processor, are constructed to facilitate the specification and execution of multiple operations simultaneously.

When using the Very Large Instruction Word architecture, processors such as those built by the now-defunct Multiflow computer company have instruction words with hundreds of bits, divided into many groups. Each group of multiple bits controls a different portion of the hardware in the processor. In such machines, numerous arithmetic-logic-units, each independently controlled, have been provided.

When using the Super Scalar architecture, the instruction unit contains control logic that allows the observation of multiple instruction words simultaneously. The number of bits in each instruction word is usually in the range of 32 to 64 bits, like most microprocessors, which is much smaller than found in Very Large Instruction Word processors. The control logic has the ability to determine when it can execute instructions out of sequence while providing normal program operation, rather than waiting for all previous instructions to execute. Thus multiple scalar operations, such as a memory operation and an operation by the arithmetic-and-logic unit, can sometimes be processed simultaneously rather than sequentially, increasing execution speed.

2.3 Digital Signal Processor Chips

Digital Signal Processor (DSP) chips, such as the Texas Instruments C80, are intended for the processing of data in real time. The rate at which data is processed and moved around must thus be rapid, but the finite processing power and I/O bandwidth of the chip impose a limit upon the amount of data and the complexity of the processing that can be performed in real time. DSP chips generally have a much smaller addressing range than provided by microprocessors because only a relatively small amount of random access memory (RAM) is required for the temporary storage and processing of live data, and because mass storage devices, such as disk drives, are rarely used.

Most DSP chips, like microprocessors, support the processing of only a single datum at one time. An exception is the Texas Instruments C80 which has one control processor and four parallel processors within it. However, these five processors operate substantially independently of one another using the multiple-instruction multiple-data (MIMD) architecture. Thus the use of the five processors in one package is substantially the same as the use of five separate processors.

2.4 Massively and Moderately Parallel Processors 2.4.1 Massively Parallel Processors Processors with thousands to tens of thousands of processors have been built using the single-instruction multiple-data (SIMD) architecture. Examples are the now-defunct Connection Machine from Thinking Machines, Inc., and the long-defunct, Illiac-IV from Goodyear. These machines have a single instruction unit that controls the operation of all of the many processors in lock-step. It is often difficult to keep all of the processors busy because the amount of parallelism in the hardware does not match the amount of parallelism in the application, and because data-dependent operations must be performed that cause large fractions of the machine to become inactive. The physical size of such machines was large, a cubic meter or more, due to the many components required to build them, and very few machines were produced due to the high price.

2.4.2 Moderately Parallel Processors

Processors with tens to thousands of processors have been built using the multiple-instruction multiple-data (MIMD) architecture. Each of the processors is typically a common microprocessor. The many processors communicate with one another over a communications network, typically via some sort of a packet-oriented protocol. Since each processor can fetch and execute instructions independently of the others, the fraction of the processors that are busy is generally better than in large machines using the single-instruction multiple-data architecture. However, some of this improved efficiency is lost by the need to send messages from one processor to another, and it is often difficult to efficiently divide a problem among the many processors. The physical size of such machines ranged from a single, fully populated, printed circuit board to one or more large cabinets.

Relatively small, parallel processors with tens to hundreds of processors have also been built using the single-instruction multiple-data (SIMD) architecture. The interconnection of these many processors is generally between registers within the processors via serial connections in one or several dimensions. The passing of data between such registers is generally difficult to represent in high level languages which purposely hide the presence of registers and focus on the processing of variables in RAM.

An example of the data path chip, the portion of the processor containing the parallel computation elements, is the CNAPS-64 chip from Adaptive Solutions, Inc. It contains 64, 8-/16-bit computation elements, each with its own small-capacity, local memory. While high performance could be obtained once data had been moved into the data path chips, the ability to rapidly move data into and out of the data path chips was severely limited, greatly hurting performance in many applications. In addition, the amount of local memory provided to each computation element was fixed at a small value and could not be expanded, and was often not optimum for the application.

In these SIMD machines, a single, external instruction unit would drive multiple data path chips simultaneously. Such a machine, like its much larger, massively parallel cousins, often operates inefficiently when the amount of parallelism in the hardware does not match the amount of parallelism in the application, and because data-dependent operations must be performed that cause large fractions of the machine to become inactive. The physical size of such machines ranged from one to several, fully populated, printed circuit boards.

In addition, the programming of such SIMD machines generally relies upon the creation of a library of data-processing subroutines that have been hand-crafted by the builders of the machine in order for users to create applications that execute relatively efficiently and program the machine relatively easily for specific tasks.

2.5 Compilers

A severe limitation in the use of parallel processors has been the difficulty of creating applications for them. After all, computing hardware is useless without software to operate it. A critical problem in the programming of parallel processors has been the difficulty of representing the parallel processing. If few applications are created for new computing hardware, little of the hardware will be sold and the hardware will be a failure in the marketplace. Such failures have occurred many times.

One of the earliest forms of parallel processing was found in the vector execution units of supercomputers, such as the Cray-1 and its next several generations of successors. These execution units were intended for doing matrix arithmetic in floating-point representation on large problems such as are found in aerodynamics and the development of nuclear weapons. Due to the complexity of the vector hardware, the vendor of the supercomputer, who best understood the operation of the hardware, typically developed a library of subroutine calls for common matrix operations. These subroutines were typically incorporated into a program being developed by the user using a FORTRAN compiler.

The programming situation with respect to prior art, moderately and massively parallel processors of the single-instruction multiple-data architecture is little changed from the programming of the vector processors of the Cray-1. The common method for representing data remains the vector, which can have hundreds to thousands or more elements. Due to the complexity of the parallel hardware, the vendor of the parallel processor, who best understands the operation of the hardware, typically develops a library of subroutine calls for common operations. These subroutines are typically incorporated into a program being developed by the user using a C compiler.

The programming situation for prior-art, parallel processors of the multiple-instruction multiple-data architecture relies upon the ability of programmers to divide a task into pieces suitable for being processed individually by each of the many processors. The use of common microprocessors assists in the understanding of the operation of a processor by the programmer, since the programming of scalar processors is well known, and enables the programmer to focus on task-partitioning and inter-processor communications aspects of the application.

3. OBJECTS OF THE INVENTION

The first object of the invention is to provide parallel processing hardware that is powerful easy to program, easy to design into systems, compact and inexpensive.

The second object of the invention is to provide software development tools that can easily represent the parallel processing, and create programs that operate the parallel processing hardware efficiently.

The third object of the invention is to provide parallel processing hardware that can move large amounts of data in and out rapidly.

The fourth object of the invention is to provide parallel processing hardware that can easily be used as building blocks for the creation of systems requiring multiple such blocks to provide additional processing power.

The fifth object of the invention is to provide parallel processing hardware that has an instruction unit and multiple groups of functional units that are controlled from a single instruction word having multiple sets of bits, where: (a) a group of functional units may have multiple like processing elements within it that are controlled in parallel from a single set of bits in the instruction word, (b) one group of functional units is controlled from one set of bits in the instruction word and another group of functional units is controlled from a different set of bits in the instruction word, and (c) another set of bits in the instruction word controls the instruction unit that sets the operating mode for each instruction that affects the operations of all processing elements.

The sixth object of the invention is to provide a method of representing the processing of multiple datum simultaneously as a simple, multi-element data structure in a high level language.

The seventh object of the invention is to provide parallel processing hardware having the means to directly implement the manipulation of a simple, multi-element data structure.

The eighth object of the invention is to provide parallel processing hardware that can move information among the parallel processors in a manner that can be easily represented in a high level language.

The ninth object of the invention is to provide the efficient, parallel processing of data using familiar, scalar programming techniques.

The tenth object of the invention is to provide cache memories that can allow the processing of portions of blocks of data being loaded into them from an external memory before all of the data in a block has been loaded into the cache from the external memory.

The eleventh object of the invention is to have multiple, parallel DMA ports that, under software control can send or receive continuous video information, or be used to interconnect multiple Parallel DSP Chips together.

4. SUMMARY OF THE INVENTION

The preferred embodiment of the Parallel Digital Signal Processor Chip, or Parallel DSP Chip, disclosed herein provides the following features:

The Parallel DSP Chip is a fully programmable, parallel, digital signal processor chip.

The Parallel DSP Chip is easy to program and design into systems.

The Parallel DSP Chip is specifically designed to support an Enhanced C Compiler for parallel processing.

The Parallel DSP Chip is a highly integrated building block that requires little or no support logic.

The Parallel DSP Chip can provide simultaneous, continuous, video capture, processing and display.

The Parallel DSP Chip has an extended, single-instruction, multiple-data (SIMD) architecture.

The Parallel DSP Chip has four, 16-bit Vector Processors and one, 24-bit Scalar Processor.

The Parallel DSP Chip has an instruction unit that has a 32-bit, reduced instruction set with some 64-bit instructions, where most instructions have multiple sets of bits, and one set of bits controls all of the Vector Processors in parallel a second set of bits controls the Scalar Processor, and a third set of bits controls the instruction unit.

The Parallel DSP Chip has two, 16-bit, double-buffered, bi-directional, video-aware, DMA ports that directly connect to common video chips and also facilitate the passing of data among multiple Parallel DSP Chips.

The Parallel DSP Chip has a 16-bit, double-buffered, bi-directional, parallel, DMA command/data port.

The Parallel DSP Chip has a general purpose, serial, debug/control port with programmable baud rate that supports the RS-232 protocol.

The Parallel DSP Chip has a read/write, serial EEPROM port for bootstrap loading of basic I/O system (BIOS) and/or programs.

The Parallel DSP Chip has a 32-bit wide, high speed port to external synchronous DRAMs.

The Parallel DSP Chip has a linear, 16 MB address space that is used for all program and data storage.

The Parallel DSP Chip has synchronous, burst pipelined, level-one, Instruction and Data Caches with efficient, 64-byte transfers and use-while-fill capability so that portions of data being fetched from memory and loaded into a cache can be used as the portions become available, rather than waiting for the entire block to be received by the cache.

The Parallel DSP Chip can a pass data among the processors within it via RAM for ease of representation of the passing of data amongst the processors in a high level language.

Multiple Parallel DSP Chips can easily be used together when higher system performance is required than a single Parallel DSP Chip can provide alone.

The Parallel DSP Chip is intended for high volume, low cost, high performance, real-time applications.

Thus, the Parallel DSP Chip disclosed herein is a versatile, fully programmable, general purpose, building block for real-time, digital signal processing and many other computation- and I/O-intensive applications.

The preferred embodiment of the Parallel DSP Chip has:
- an extended, single-instruction multiple-data (SIMD) architecture with four, 16-bit vector processors that accumulate products to 40-bits;
- a 24-bit scalar processor for program control, and computing data and program addresses and loop counts;
- a 32-bit instruction unit;
- a 1 KB, 2-way, set-associative, synchronous, burst-pipelined, data cache with 16, 64-byte pages, for use by the vector processors;
- a 1 KB, 2-way, set-associative, synchronous, burst-pipelined, instruction cache with 16, 64-byte pages, for use by the instruction unit and scalar processor, and
- a crossbar switch for passing information among the on-chip processors.

The Parallel DSP Chip's general purpose, reduced instruction set for parallel digital signal processing handles a wide range of high performance applications. Most instruction words are 32 bits long and are executed by a pipelined instruction unit at the rate of one per clock cycle. Five instructions are typically executed for every instruction word as a result of the parallel architecture. A single, linear, 16 MB, memory address space is used, simplifying program development. The storage of 8- and 16-bit parallel data types is supported to maximize memory utilization. The Parallel DSP Chip is specifically designed to support the Enhanced C Compiler disclosed herein and has two software stack pointers, one for the vector processors and one for the scalar processor, plus an interrupt stack pointer.

The Parallel DSP Chip, with its single instruction unit that simultaneously controls four vector processors in parallel using one group of bits, and one scalar processor using another group of bits found in a single instruction word, executes a single task in parallel. Using an Enhanced C Compiler, simple, familiar, scalar processing programming techniques can be used, and a simple, single-task operating system can be used for software development.

The basic programing concept is to define one or more arrays of four-element structures using the Enhanced C Compiler. One element in such a structure is provided for each of the four vector processors. The structure to be processed at any one time is selected by an address computed by the scalar processor. The same operation is applied to all of the elements of the structure by the simultaneous operation of the vector processors. To access the next structure in an array of structures, the scalar processor advances the address by the number of bytes in the structure.

For large memory capacity and bandwidth, large IO bandwidth, and ease of interconnection to I/O devices and other Parallel DSP Chips, the Parallel DSP Chip has six ports:

Two, 16-bit, bi-directional, asynchronous, double-buffered, video-aware, parallel DMA ports are provided for loading data and for passing information among multiple Parallel DSP Chips. No glue logic or frame buffers are required to connect common video decoder and encoder chips to the Parallel DSP Chip.

When operating with a 100 MHz clock, a 32-bit wide, high performance memory port with 64-byte bursts provides a 400 mega-bytes/S interface to inexpensive, synchronous DRAMs for virtually instantaneous access to up to 16 MB of program, data and I/O buffers, sustaining high performance for live video, large data sets and large programs. No memory bus resizing is done, so the full memory bandwidth is available at all times. The optional use of multiple banks of synchronous DRAMs provides multiple level-2 cache memories, increasing performance in I/O-intensive applications.

A serial port to an inexpensive, external, serial EEPROM is provided for the loading of programs and/or Basic I/O System Software (BIOS), which is loaded into the synchronous DRAMs via the Parallel DSP Chip upon reset. The serial EEPROM can also be loaded from the Parallel DSP Chip for ease of modification.

A 16-bit, bi-directional, asynchronous, double-buffered, parallel, command/data DMA port provides program-loading and access to results.

A general purpose, serial debug/control port with programmable baud rate supports the RS-232 protocol and can be used for serial I/O and to provide test access for in-situ application development.

A basic system nucleus requires only three chips: (1) a Parallel DSP Chip, (2) a 32-bit synchronous DRAM, and (3) a serial EEPROM, yet provides the ability to capture, process and display live video images. No external video capture or display buffers are required. Pixel, line and frame sync signals are directly supported by the video-aware, parallel DMA ports for ease of video interface.

It is to be noted that the parameters given above in the preferred embodiment, including but not limited to the number of vector processors, precision and data types of the vector and scalar processors, number of bits in the instruction word, sizes and types of memories, sizes and nomenclature of the data structures manipulated, and choice of compiler, are only examples and do not limit the generality of the disclosure.

5. BRIEF DESCRIPTION OF THE DRAWINGS

Note: For ease of reference by the reader, the reference numbers used herein are of the form XXYY, where XX is the Figure number and YY is a reference within that Figure.

6. DETAILED DESCRIPTION OF THE INVENTION

It is to be noted that the parameters given herein in the preferred embodiment, including but not limited to, the number of vector processors, precision and data types of the vector and scalar processors, number of bits in the instruction word, sizes and types of memories, sizes and nomenclature of the data structures manipulated, and choice of compiler, are only examples and do not limit the generality of the disclosure.

6.1 Chip Architecture 6.1.1 Introduction

For brevity, the Parallel Digital Signal Processor Chip with Simplified Programming, which is disclosed herein, will be referred to as the Parallel DSP Chip.

Figure 1:
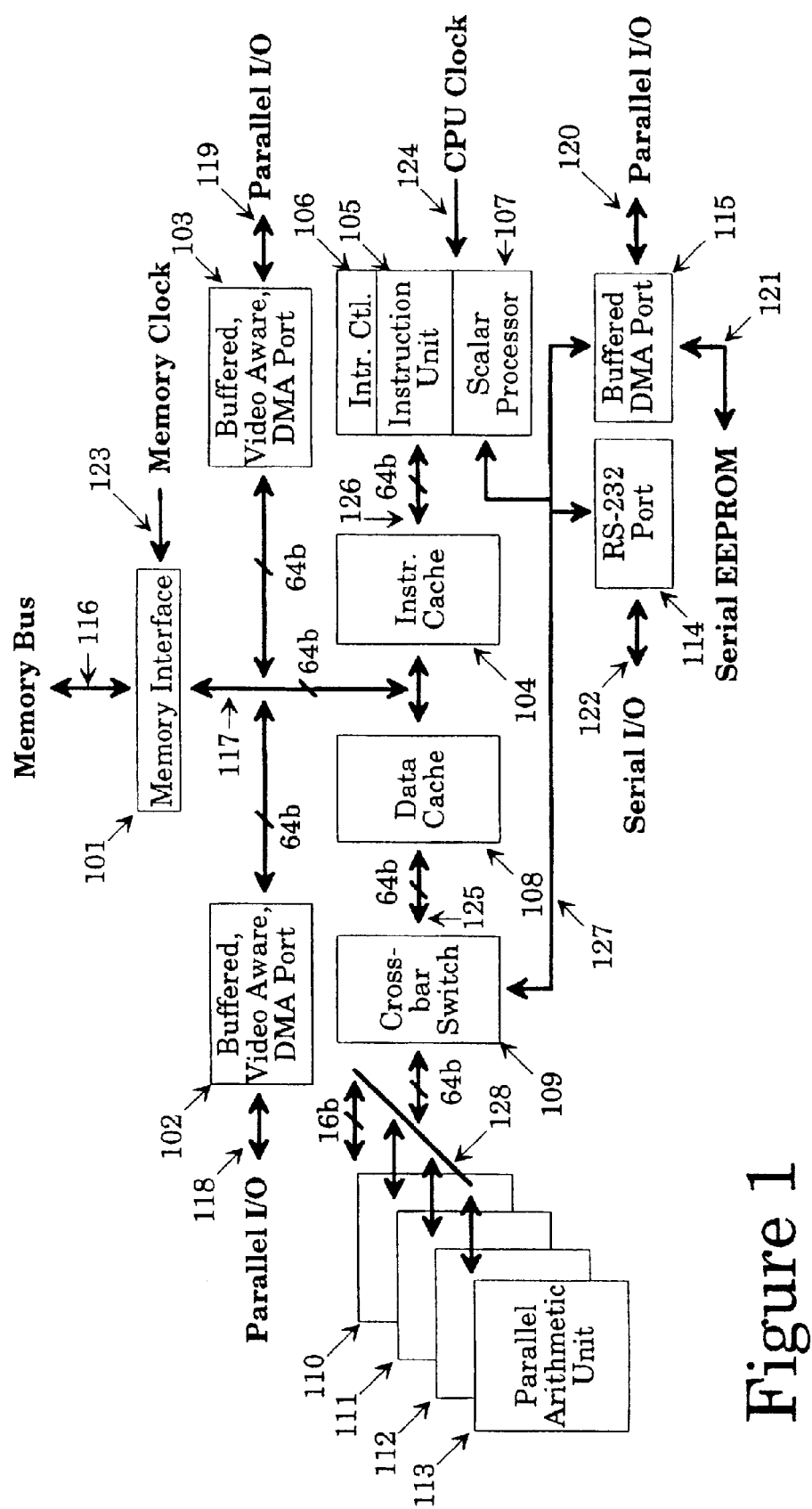
FIG. 1 shows a block diagram of the preferred embodiment of the Parallel DSP Chip according to this invention.

FIG. 1 shows the block diagram of the Parallel DSP Chip. The major blocks are:

Memory Interface 101

Parallel DMA Data Ports 102 and 103

Instruction Cache 104

Instruction Unit 105

Interrupt Controller 106

Scalar Processor 107

Data Cache 108

Crossbar Switch 109

Parallel Arithmetic Unit with four Vector Processors, 110 through 113

Serial Port 114
Parallel DMA, Control Port 115
These blocks are described in the following sections.

6.1.2 Memory Interface

The Memory Interface 101 connects the Parallel DSP Chip to an external random access memory as 501 via a memory bus 116. It is designed to efficiently transfer blocks or packets of 64 bytes between the Parallel DSP Chip and the external memory. This packet size is used throughout the Parallel DSP Chip, including the Parallel DMA Data Ports 102 and 103, and the Parallel DMA, Control Port 115, where the buffer size is twice the packet size to provide double-buffering. In addition, in the Data Cache 108 and Instruction Cache 104, the cache page size is the same as the packet size.

The Memory Interface is configured to operate with high speed, high capacity, low cost, SDRAMs (synchronous DRAMs). It converts an external high speed, 32-bit wide synchronous bus to an internal, lower speed, 64-bit wide, synchronous, on-chip memory bus 117. Memory bandwidth is 400 MB/S (megabytes per second) using a 100 MHz memory clock 123, which is divided by two to give a clock speed of the internal wider memory bus of 50 MHz. The Memory Clock is independent of the CPU Clock 124.

Stride Capability

The Memory Interface has a special feature for transferring data. I call this feature transfer-with-stride. Memory stride allows a sequence of words to be retrieved from, or stored in, the external memory with an address offset or stride.

The Memory Interface and Parallel DMA ports work together to provide stride capabilities. Most of the stride feature is implemented in the Memory Interface, however, the DMA ports have the stride control register and can indicate end-of-line and end-of-frame for strided image data. The stride control register stores the offset. A stride of one would indicate that data is stored normally, in sequential addresses. A stride of four is a matrix transpose.

Having stride control is important because the inherent nature of the four parallel Vector Processors 110 through 113 is to process data that is organized in column-major form; data is stored by filling a column of a matrix first. However, most peripheral devices expect and output data in row-major form; data is stored by filling rows. Memory stride control allows the Parallel DSP Chip to convert a row-major organized data stream into column-major form. This in effect has each Vector Processor operating on a row of data Once all processing is complete, the memory interface can use the transfer-with-stride feature to output the data in row-major form.

A matrix transpose is a very memory-access intensive operation involving the exchange of all row entries with column entries and vice-versa. This is generally a very time consuming task for any processor, however, using transfer-with-stride it is simple but results in a 75% loss of main memory bandwidth. This is a significant loss, however I have enough main memory bandwidth that a stride of four (matrix transpose) can take place without slowing down the parallel port bandwidth. Therefore, the Parallel DSP Chip can accept data to or from its parallel ports with no degradation in I/O performance and still do a matrix transpose. The size of the matrix has little effect, only requiring additional time to load.

6.1.3 Parallel DMA Data Ports

Compared to the main memory port with memory bus 116, each Parallel DMA Data Port 102 and 103 is a relatively slow speed port (typically 40 MB/S maximum) for moving data into and out of the Parallel DSP Chip. A 128-byte, bi-directional FIFO as 202 is provided in each Parallel DMA Port in the Parallel DSP Chip to buffer data between the port and the internal synchronous memory bus 117. The capacity of the FIFO has been chosen to avoid data loss.

Figure 2:
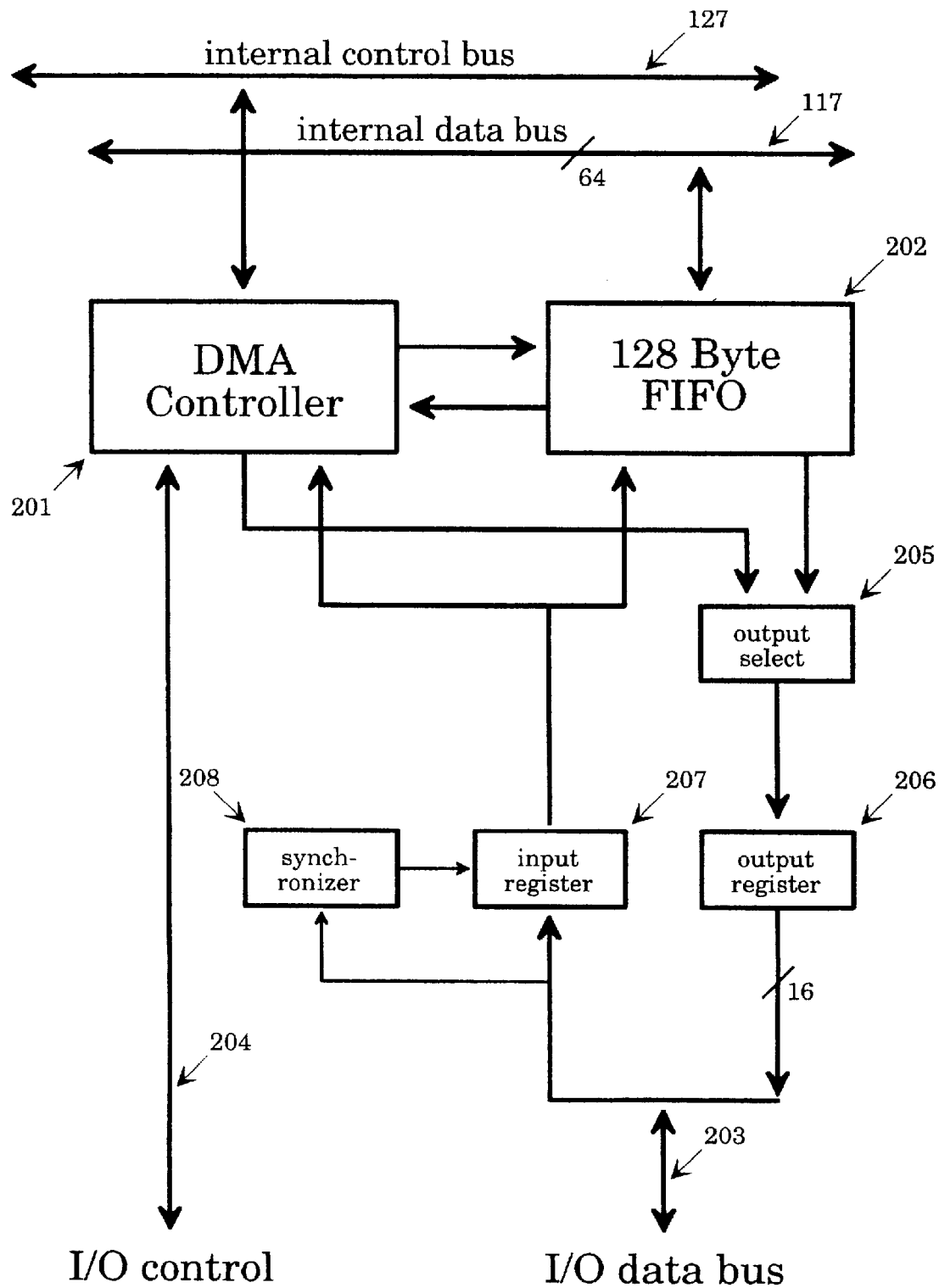
FIG. 2 shows a block diagram of a Parallel Port of the preferred embodiment of the Parallel DSP Chip according to this invention.
Figure 3:
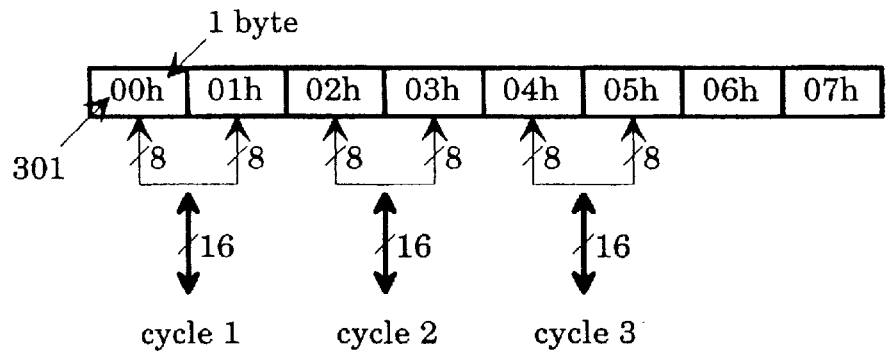
FIG. 3 is a data flow diagram showing sequences of word and byte transfers within the parallel DMA ports within the preferred embodiment of the Parallel DSP Chip according to this invention.
Figure 3:
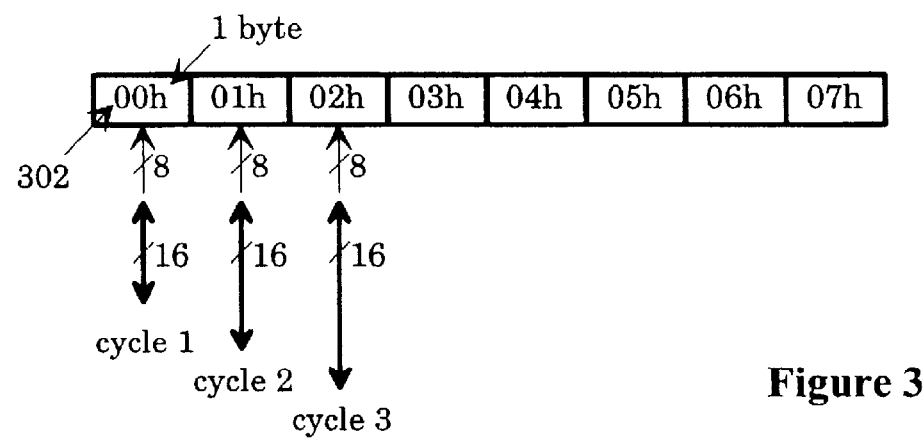

A block diagram of a Parallel DMA Data Port as 102 is seen in FIG. 2. The Parallel I/O Bus 118 is represented by the combination of the I/O Data Bus 203 and I/O Control Bus 204. The DMA Controller 201 receives control information from, and passes status information to, the Scalar Processor 107 via the Internal Control Bus 127. Data is passed between the FIFO 202 and the Memory Interface 101 via the Internal Memory Bus 117.

The design of the Parallel DMA Control Port 115 is substantially the same as the design of the Parallel DMA Data Ports 102 and 103. The difference in names primarily describes a difference in intended usage of the ports, although the Parallel DMA Data Ports will typically be provided with signal pins to allow them to easily handle a variety of video formats which the Parallel DMA Control Port would not need and would not be provided with in order to reduce the number of pins required to build the Parallel DSP Chip.

The FIFO 202 is logically organized as two, 64-byte buffers, equivalent in size to two packets handled by the Memory Interface 101. At the maximum port data rate, a 64-byte transfer to or from external memory is required every $1.6\,\mu S$, and the time to accomplish the transfer is about 160 nS plus 100 nS row access time, for a total of 260 nS, with a 400 MB/S memory bandwidth. Thus there is plenty of time for the Parallel DSP Chip to service multiple Parallel DMA Data Ports running simultaneously, while servicing program execution.

To convert from the high speed, 64-bit, internal memory bus 117 to the low speed, 16-bit, I/O Data Bus 203, each FIFO 202 is organized as 8 bytes wide by 16 words deep. The FIFO is byte addressable, thereby allowing a minimum transfer word size of 8 bits to and from the external I/O bus.

The FIFO 202 is built from a dual-port SRAM. Since data flows into one port of the SRAM and out of the other, the reading of one port of the SRAM and writing of the other can occur simultaneously and independently of one another. The Parallel DMA Data Port as 103 is bi-directional and can be configured by software so that data can flow into or out of it, reversing the flow of data in both ports of the SRAM. The direction is specified by a bit in a control register in the DMA Controller 201.

The I/O Data Bus 203 operates in either 8- or 16-bit mode to handle bytes and words. A 7-bit counter in the DMA controller 201 selects an 8- or 16-bit word in the FIFO 202 for reading or writing so that an external I/O device need only supply or absorb a stream of data without providing addresses. The internal memory bus 117 operates only on 64-bit words, so a 4-bit counter in the DMA controller 201 selects a 64-bit word in the FIFO for reading or writing.

Data being sent from the Parallel DMA Port to the I/O Data Bus 203 comes from either the DMA Controller 201, for the packet header, or the FIFO 202 for the packet data, as explained subsequently. The selection is made by a multiplexer 205 under control of the DMA Controller 201. The data from the multiplexer is temporarily stored in a register 206 so it can be clocked out by a clock supplied by the external receiver of the data.

Data being received by the Parallel DMA Port from the I/O Data Bus 203 is clocked into a register 207 by a clock supplied by the external sender of the data In this register, which is under control of a synchronizer 208, the data is reclocked by the clock, which is one-half the frequency of the Memory Clock, 123, that is used by the DMA Controller 201, prior to passage to the FIFO, if the header of a packet is being received, and the DMA Controller, if the data of a packet or other data stream is being received.

DMA Control Registers

The operation of a Parallel DMA Data Port as 102 is controlled by registers in the DMA Controller 201 in the parallel port. These registers can be accessed using the extended register set of the Scalar Processor 107. These registers include the source address, destination address, status register, interrupt vector, transfer size register, and several others to support NTSC (National Television Standards Committee) compliant video data transfers.

Either the source address register or the destination address register in the DMA Controller 201 can hold the address where data is accessed in the memory connected to the Parallel DSP Chip. Which address is used is determined by the type of operation being performed. If a Parallel DSP Chip requests data be sent to it from an external device, then the destination address register is used when writing to the memory connected to the Parallel DSP Chip. If the Parallel DSP Chip requests to send data to an external device, then the source address register is used to read data from the memory of the Parallel DSP Chip.

The 24-bit transfer size register contains the number of bytes to transfer. The 24 bits are sufficient to store transfer sizes up to 8 mega-words or 16 Mbytes, the entire address space.

The status register contains the control bits for stride control, circular-double buffering, interrupt mask, transfer mode (byte or word), direction of transfer, transfer enable, initialization, and count direction.

The transfer enable bit in the status register is for enabling the parallel port. This bit can be set to begin a transfer, cleared to terminate a transfer, or tested to see if the port is active.

The initialization bit in the status register controls the initialization sequence. The port can be initialized externally, i.e. an external peripheral is requesting a transfer, or internally, ie. an external peripheral is requesting a transfer but is not capable of sending a setup control sequence. In the latter case, the Parallel DSP Chip initializes itself.

The count direction bit in the status register gives control over how the data is stored in memory. If the direction is down, then data is stored in descending order. If the direction is up, then data is stored in ascending order.

The interrupt vector register stores the address location for the interrupt service routine that is called when an end-of-frame is encountered. A typical application would be to begin processing the data that has just been buffered in memory.

Transfer Sizes

The Parallel DMA Data Port can support two data types, 8-bit bytes and 16-bit words. Even though the external bus 203 is 16 bits wide, the transfer size can be set to interpret the data as 8- or 16-bit quantities. These two sizes, or modes, are necessary to support the Vector Processors' byte and word operations, or in the context of the Enhanced C Compiler, __quad__char and __quad__short data types. Using byte mode cuts the parallel I/O bandwidth in half because only eight bits, the eight least significant bits, of the 16-bit bus 203 are used.

The DMA controllers support two data transfer sizes by changing the increment on the 7-bit address counter for the FIFOs. As shown by the FIFO address sequence 301, an increment of two is used for word transfers and 16 bits are transferred on every transfer cycle. As shown by the FIFO address sequence 302, an increment of one is for word transfers and only 8 bits are transferred on every transfer cycle.

Circular-Double Buffering

Figure 4:
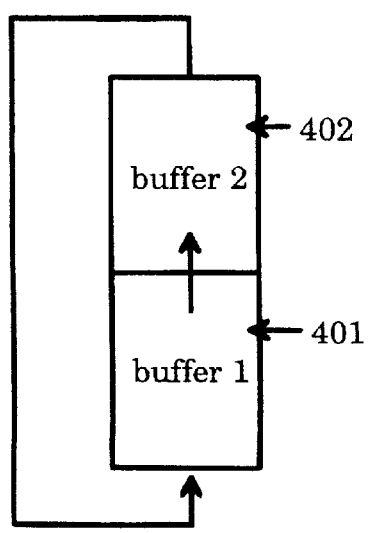
FIG. 4 is a data flow diagram showing the use of circular double buffering by the preferred embodiment of the Parallel DSP Chip according to this invention.

Circular-double buffering allows the user to establish a frame size and replicate the frame allocation to support buffering of many frames without the need to request the transfer of additional frames. When one buffer 401 is full then the other buffer 402 will begin to fill. Buffers are sequentially filled until the allocated space is consumed, at which time the buffering returns to the beginning address. This forms a circular type behavior as illustrated in FIG. 4 using two buffers.

When the first buffer is full it sends a request to the Interrupt Controller 106 indicating that a buffer has been loaded into memory and can be processed. While the Parallel DSP Chip is processing the data in the first buffer, the DMA ports continue to fill the additional buffers. The number of buffers is user selectable. This process continues until a terminate signal is asserted.

The advantage to circular-double buffering is that a transfer can be set up and then continue indefinitely without having to start another transfer. This is especially useful in processing real-time data which is constantly needing buffering followed by processing.

Operating Modes

Each parallel DMA port has two operating modes, video and packet, that are programmed via port control registers in the DMA Controller 201 in a Parallel DMA Data Port in the Parallel DSP Chip.

In video mode, data clocking is provided by an external device, such as a video encoder or decoder, and the Parallel DSP Chip sends or receives data, usually continuously. Since the Parallel DMA Data Ports are designed to directly connect to common video encoder and decoder chips, such as from Philips, I call the ports video-aware.

In packet mode, a Parallel DSP Chip sends or receives a single block of information. In packet mode, a short header in the beginning of the packet specifies information required to send the packet from an external device to a Parallel DSP Chip or between multiple, Parallel DSP Chips. The nature of the packet is described subsequently.

Interconnection of Multiple, Parallel DSP Chips

Some high-end, image processing applications require more processing power than a single, Parallel DSP Chip can provide. These applications can be handled compactly and inexpensively by using multiple Parallel DSP Chips in parallel The Parallel DSP Chip is specifically designed to be used in arrays when additional processing power is required. Very little support logic is required to build these arrays.

Figure 5:
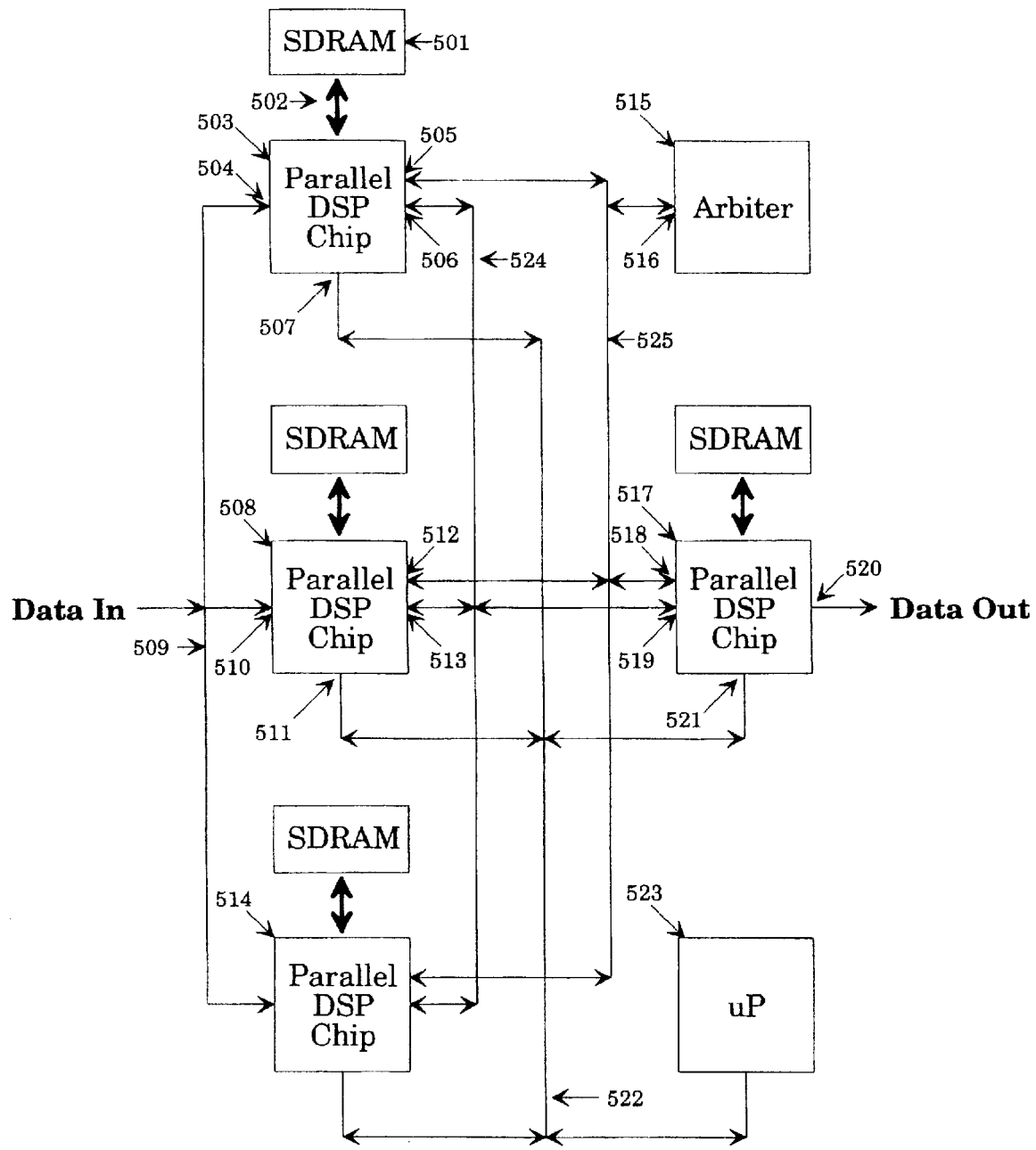
FIG. 5 is a block diagram of a series-parallel array of Parallel DSP Chips according to this invention.

One of both of the two, video aware, Parallel DMA Ports 102 and 103 of each Parallel DSP Chip can be used for connecting multiple Parallel DSP Chips 503, 508, 514, 517 in a series-parallel configuration to build a systolic array as shown in FIG. 5. Each Parallel DSP Chip as 503 has a local memory 501 that is connected to it via a memory bus 502, shown as 116 in FIG. 1. A small amount of control logic, an Arbiter 515, external to the Parallel DSP Chips is required to manage the flow of data between multiple Parallel DSP Chips connected to a given bus 522. The Parallel DMA Control Ports as 507, 511, 521 shown as 115 in FIG. 1 with its Parallel I/O Bus 120, of all of the Parallel DSP Chips can be connected together to form a common point of program loading and data access for all of the Parallel DSP Chips in the array. A microprocessor 523 can provide such program loading and control. A port-enable pin on the Parallel DMA Control Port enables the selection of a Parallel DSP Chip by an external circuit such as may be controlled by the microprocessor. Alternatively, the serial ports of all of the Parallel DSP Chips can be connected to a common controller with enough ports to connect to all of the Parallel DSP Chips.

In FIG. 5, a data input, Data In, is connected to an input bus 509 that is wired to the first Parallel DMA Data Ports as 504, 510 of the first group of Parallel DSP Chips as 503, 508. Such input data might be a video source. The second Parallel DMA Data Ports as 506, 513 of this first group of Parallel DSP Chips are connected to a bus 524 that is connected to first Parallel DMA Data Port 519 of a second group of Parallel DSP Chips as 517. The second Parallel DMA Data Port 520 of the latter Parallel DSP Chip 517 is connected to an output bus, Data Out, that might be enhanced video data.

The architecture for such a systolic array of Parallel DSP Chips is a hybrid, MIMD-SIMD. Each Parallel DSP Chip is a stand-alone, single-instruction multiple-data (SIMD) processor with its own local memory, its SDRAM. The instruction units of the various Parallel DSP Chips in the array operate independently of one another, providing a multiple-instruction multiple-data (MIMD) architecture. This combines the hardware efficiency of SIMD at the chip level with the software efficiency of MIMD at the system level. An application using multiple Parallel DSP Chips can be built from a collection of cooperating programs, each running on a single Parallel DSP Chip.

Information can be communicated between the various Parallel DSP Chips via the parallel DMA ports by packets. Data from one Parallel DSP Chip can be broadcast to all of the other Parallel DSP Chips on a bus 524, or to any combination, as controlled by the Arbiter 515. The packet size is limited only by the amount of memory connected to a Parallel DSP Chip. All Parallel DMA Ports are double-buffered and can transfer data to/from their local memory as 501 at full memory bandwidth.

The transmission of a packet takes several steps that occur in quick succession.

The contents of a packet are:
header word 1—base address bits 15 . . . 0 (the 16 lsbs)
header word 2—base address bits 23 . . . 16 (the 8 msbs), and transfer size bits 7 . . . 0
header word 3—transfer size bits 23 . . . 8
header word 4—select code bits 7 . . . 0, and control bits 7 . . . 0
data words—data being transferred The base address specifies the starting memory address for the transferal of data to or from the target Parallel DSP Chip(s). Data can be sent to one or more Chips, or read from one. The transfer size is the number of bytes to be transferred; it is useful for error checking. The select code tells the Arbiter which Parallel DSP Chip(s) are the target of the DMA transfer, which the Arbiter-decodes and uses to activate the port enable lines. The control bits specify whether a read or write operation is to be performed. Some of the bits are unused.

A DMA transfer from one Parallel DSP Chip as 503 to another as 517 is started by software that sets a Bus Request bit in a DMA control register in the DMA Controller 201 in the Parallel DMA Port in the Parallel DSP Chip requesting the transfer. Such a transfer may be required when the processing of a portion of a video frame by the Parallel DSP Chip is completed. The Bus Request signals from all of the Parallel DSP Chips form part of a control bus 525 that is received by an Arbiter 515. The remainder of the control bus 525 contains a set of port enable signals and the Bus Acknowledge signals, all of which are sent from the Arbiter to all of the Parallel DSP Chips on the bus. An Arbiter is provided for each bus being shared by multiple Parallel DSP Chips.

The Arbiter grants the use of the bus 525 when the bus is idle, and sends a Bus Acknowledge signal to the Parallel DSP Chip as 503 that may use the bus. If the Arbiter receives multiple bus requests simultaneously, it grants the bus to the Parallel DSP Chip having the highest priority. The selected Parallel DSP Chip temporarily becomes the Bus Master and sends the packet header on the bus. The packet header is received by the Arbiter and the DMA Controller in the Parallel DMA Data Port in each Parallel DSP Chip on the bus. The Arbiter asserts the port enable lines of all Parallel DMA Ports that are to participate in the transfer. An interrupt is generated within the selected Parallel DSP Chip in response to the receipt of the Bus Acknowledge signal.

Software in the Parallel DSP Chip that is Bus Master then initializes the remainder of the DMA control registers in the Parallel DSP Chip and starts the DMA transfer of the data The registers could not be loaded until now because had they been loaded earlier, an incoming packet header would have corrupted them. The transfer of the data is then performed.

An interrupt is generated in each of the active Parallel DSP Chips upon completion of the data transfer portion of a packet. In this way, one Parallel DSP Chip can reach into the memory of another Parallel DSP Chip and place data in it or obtain data from it. The occurrence of an interrupt enables the execution of a process in response to the completion of the transfer of data.

A typical use of multiple Parallel DSP Chips is an image processing application where many operations are required per pixel per frame. The pixels in a frame can be divided into groups of adjacent scan lines, and each Parallel DSP Chip processes one of these portions of a frame. The large, low cost, memory capacity of the Parallel DSP Chip enables many frames to be buffered economically by each Parallel DSP Chip.

6.1.4 Instruction Cache

The Instruction Cache 104 is a two-way, set-associative cache memory. It provides not only 32- and 64-bit instructions to the Instruction Unit 105 but also scalar data to the Scalar Processor 107, via a 64-bit bus 126. The Instruction Cache can be read and written by both the Instruction Unit and the Scalar Processor. When an interrupt occurs, a 64-bit, processor status word can be written into the Instruction Cache. Alternatively, the Scalar Processor writes to external memory as 501 via the Instruction Cache.

The Instruction Cache is implemented as a dual-port memory so that it can be accessed by the Instruction Unit and/or Scalar Processor at the same time that it is being filled from an external memory as 501 via the Memory Interface 101. Its capacity of 1 KB is enough to store between 128 and 256 instructions, enough to store I/O routines and several program loops. A small Tag RAM stores the information necessary to determine whether or not a program segment or scalar data is stored in the cache, and whether or not the information in the page has been modified while it has been stored in the cache. The page size is 64 bytes, so a total of 16 pages can be stored in the Instruction Cache; this is the same page size used in the Data Cache 108.

The output 126 from the Instruction Cache 104 to the Instruction Unit 105 is 64 bits wide so that extended (64-bit) instructions, which must be 8-byte aligned, can be read out in a single cycle. A multiplexer in the Scalar Processor, which has 24-bit data paths, selects either the upper or lower 32 bits of data for operation, and selects bits 23 . . . 0 of a 32-bit word. When a write from the Scalar Processor to memory occurs, the 24-bit word is sign extended to 32 bits.

When a read miss from either the Instruction Unit or Scalar Processor occurs, i.e., when needed instructions or data are not in the Instruction Cache, control logic within the Instruction Cache enables execution to proceed as soon as the needed words from memory as 501 have been loaded into the cache, rather than waiting for completion of a 64-byte, block read from the memory interface. I call this use-while-fill operation.

Since only relatively large, 64-byte transfers are made between the Instruction Cache 104 and the external memory as 501, a relatively long period of time can elapse while the transfer takes place. This time period is equal to several cycles of the CPU Clock 124. Suspending operation of the Instruction Unit or the Scalar Processor while the entirety of such a large block is accessed would significantly reduce performance. Quite often, the availability of a word that is in the first part of the block would enable execution to proceed. Thus, to improve performance, I provide the means to see if the needed information is available from the Instruction Cache and to resume execution as soon as it becomes available from the cache, even if the entirety of the transfer has not been completed. I also provide the means to temporarily resuspended execution if a later portion of a block being received by the Instruction Cache is needed but not yet available, and resume execution when the data becomes available.

The method for implementing use-while-fill is as follows:

1) When a cache read miss occurs, a counter is loaded with the starting address of the block required to fill the missing page in the cache.
2) As the block is read from memory and loaded into the cache, the counter is advanced to reflect the address of the data most recently received by the cache.
3) As the block is read from memory and loaded into the cache, the contents of the counter is compared to the address of any operand or instruction required from the cache for program execution; program execution is allowed to proceed if the operand or instruction is available in the cache.
4) Once the entire block is loaded into the cache, normal cache operation resumes based upon the presence of complete blocks, or pages, in the cache.

Note that a cache read miss can occur when either it is necessary to read an instruction or operand from memory, or, when it is necessary to write an operand to memory. To write an operand to memory, an entire block of data must be present in the cache so any portion of it can be modified; it may be necessary to read this block of data into the cache.

The Data Cache 108 operates similarly to provide use-while-fill.

When a write from the Scalar Processor to memory occurs, the Instruction Cache is updated immediately and the cache page is marked changed. The write to main memory is delayed until the page is selected for replacement, at which time the entire page is copied from the Instruction Cache to main memory. This avoids potentially frequent, inefficient, short burst size writes to main memory. Since the memory interface is a single master, there are no conflicts.

Memory addressing is handled as follows:
bit 0—ignored (2-byte alignment required)
bits 5 . . . 1—address within 64-byte page
bits 8 . . . 6—page index, remapped by cache controller to produce 4-bit page index
bits 23 . . . 9—match to Tag RAM to detect presence of page Page Locking The Parallel DSP Chip has built-in mechanisms for page locking. Page locking allows the user to specify that a particular page must remain within the cache. Page lock requests are issued using the s_lock instruction. Likewise, page unlock requests are issued using the s_unlock extended instruction. When the Parallel DSP Chip executes a page lock request, there is no way to determine exactly where the data resides relative to the cache or even if the data is currently in the cache.

To provide feedback for caching operations, each cache status register has 8 bits that indicate row failure status. The upper 8 bits of the status register are used to store the failure bits. These failure bits are set or cleared on the cycle following a cache page lock or unlock request. If the failure bits are all cleared then the lock was successful, if any bit is set then the lock was a failure and appropriate action can be taken.

The lower 16 bits of the cache status register hold the current lock-state for each of the 16 pages. If a bit is set then the respective cache page is locked. These bits are read-only. The cache controller is responsible for setting or clearing the bits in response to lock and unlock requests.

With a two-way, set associative cache, a cache row contains two pages and the cache replacement algorithm (least recently used, LRU) supports only one locked page per cache row so that at least one page is available for any address. If a request to lock a page on a row which currently has a locked page is made then the failure bit for a row is set at the end of the cycle. The requested page is not locked and the currently locked page remains locked.

6.1.5 Instruction Unit

The Instruction Unit 105 has a pipeline with three stages for the scalar control bits that control the Scalar Processor 107 and four stages for the vector control bits that control the Vector Processors 110 to 113. An understanding of the instruction set, described herein, for the Parallel DSP Chip is assumed for the following discussion.

The main blocks in the Instruction Unit are:
Program Counter
Instruction Decode
Scalar Instruction Register, Scalar Execution
Vector Instruction Register, Vector Execution The operation of the Instruction Unit for a simple instruction is:

1. The contents of the Program Counter are used to access the Tag RAM. The Cache Tag and Program Counter are compared to detect the presence of the required page. The Tag RAM Register is loaded at the end of the clock cycle. The Program Counter is loaded or updated at the end of every active cycle.
2. If the instruction is in the Instruction Cache 104, the Instruction Cache is accessed using the contents of the Tag RAM Register; otherwise a cache miss operation is begun. If the instruction is present, the contents of the decode buffer, which is 64-bits long, are partially decoded to determine whether a 32-bit, Basic Instruction or a 64-bit, Extended Instruction is being decoded. Additionally, the register window, which increases the number of registers that may be addressed, for the Vector Processors is resolved. Finally, the opcode modifier is decoded to provide secondary decoding for the scalar opcode field. The Scalar Instruction Register is loaded from the decode buffer at the end of the clock cycle.
3. The contents of the Scalar Instruction Register, which are somewhat longer than 64 bits, are executed by the Scalar Processor. The major data paths, such as scalar register addressing and the ALU operations in the Scalar Processor are controlled directly. The opcode modifier, registered in the Scalar Instruction Register, is again used to provide secondary decoding, now for the vector opcode field. The Vector Instruction Register is loaded from the Vector Control Bits of the Scalar Instruction Register at the end of the cycle.

4. The contents of the Vector Instruction Register are executed by the Vector Processors. The major data paths of the Vector Processors and vector register addressing are controlled directly.

Most instruction words specify the operation of the Scalar Processor and all of the Vector Processors. The Vector Processors execute the operation specified in a given instruction word one cycle after the execution by the Scalar Processor of the operation specified in the same instruction word. This is because memory must be addressed before the data can be used, and, with the use of cache memories, the addressing and use are each given one full cycle of the CPU Clock 124. The Scalar Processor must generate the address for any memory reference, whether it is for itself or for the Vector Processors, one cycle before the contents of the addressed memory location can be used.

Thus requiring the Vector Processors to execute one stage later in the pipeline than the Scalar Processor gives the Parallel DSP Chip single instruction execution for memory operations by the Vector Processors. Since the Parallel DSP Chip uses a form of reduced instruction set, where most operations are performed at the rate of one operation per clock cycle, two instructions, first the creation of a memory address and then the use of the memory location, are required by the Scalar Processor to access memory. Hence the Vector Processors can access memory every clock cycle whereas the Scalar Processor can access memory every other clock cycle.

6.1.6 Interrupt Controller

The Interrupt Controller 106 handles the interrupt requests generated within the Parallel DSP Chip. Interrupt requests are primarily generated by the Parallel DMA Data Ports 102 and 103, the Parallel DMA Control Port 115, and the Serial Port 114. Error conditions detected by the other blocks, such as the Memory Interface, can also cause interrupt requests.

Each unit that can generate an interrupt request has a set of control registers that enable or disable the interrupt for each interrupt condition supported by the unit, have an interrupt fag bit for each interrupt condition supported by the unit, and store a programmable, interrupt vector. For each unit, for each interrupt condition supported, an interrupt flag bit is ANDed with the interrupt enable bit for that flag, and the set of these AND gates is ORed together to create an interrupt request for that unit.

The Interrupt Controller receives the interrupt requests from all of the units. Each is assigned a priority, with the units having faster data rates having higher priorities. If interrupts have been enabled by the execution of an instruction that enables interrupts, then the Interrupt Controller responds to the highest priority interrupt. It requests that the Instruction Unit 105 suspend normal instruction execution. Once normal program execution is suspended, interrupts are disabled and the processor status word (PSW) and the contents of the PC, which specifies the next normal program address, are stored in memory at the address specified by the register in the Scalar Processor that is designated as the Interrupt Stack Pointer. Using a push-down stack, the register is decremented accordingly. Since memory is accessed by the Scalar Processor 107 and Instruction Unit 105 via the Instruction Cache 104, the data is actually stored in the Instruction Cache.

The interrupt vector from the unit being serviced is then loaded into the program counter in the Instruction Unit and processing of an interrupt service routine begins. The interrupt service routine will eventually reenable interrupts and resume normal program execution.

6.1.7 Scalar Processor

Figure 6:
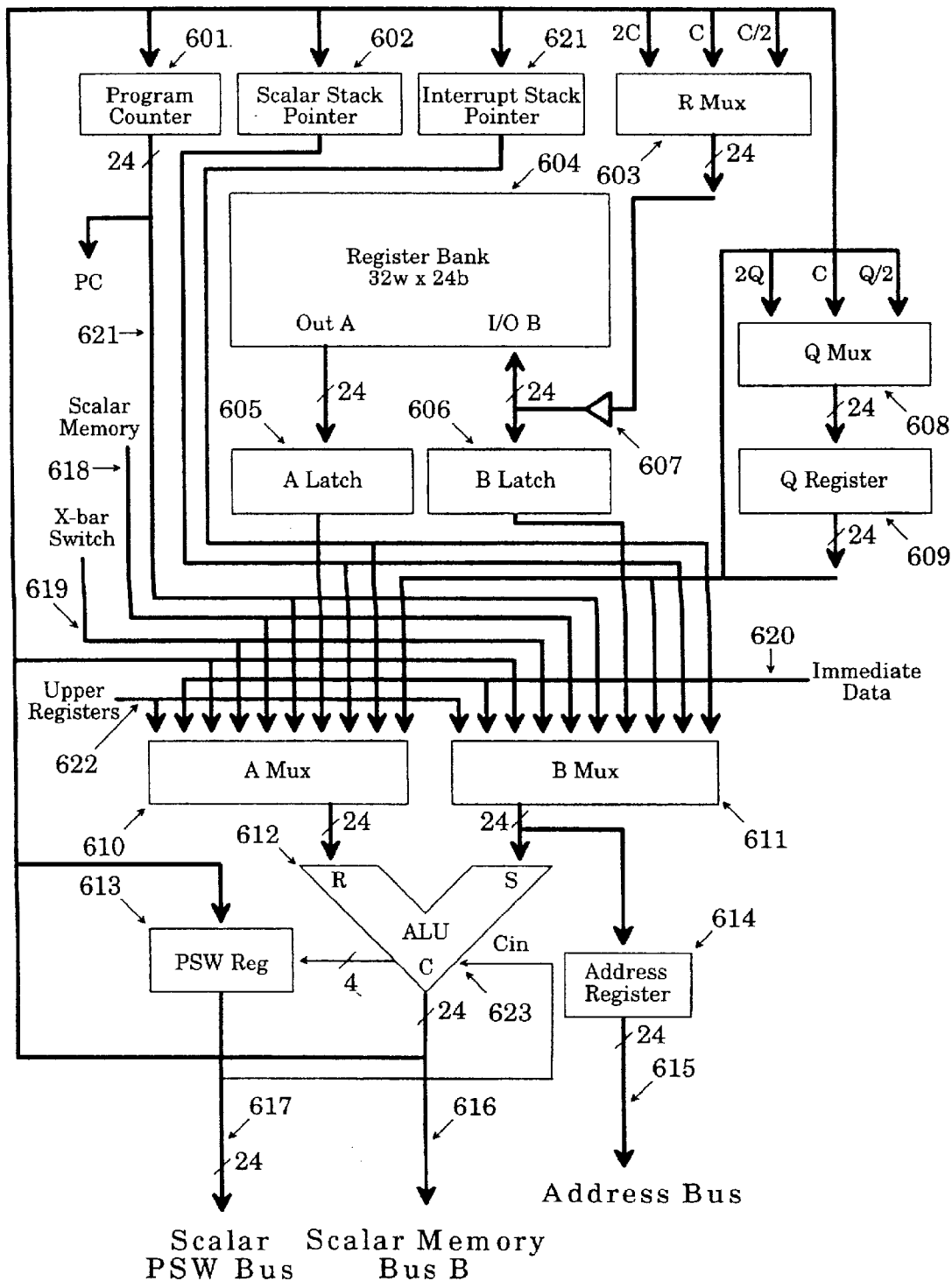
FIG. 6 is a block diagram of the Scalar Processor within the preferred embodiment of the Parallel DSP Chip according to this invention.

The block diagram of the Scalar Processor 107 is shown in FIG. 6. All major data paths are 24 bits wide so as to be able to address 16 MB (megabytes) of external memory. All elements are controlled by the Instruction Unit 105.

The Scalar Processor has:
Dual-port Register Bank 604 with one output port and one input/output port
ALatch 605 and BLatch 606
ALU 612
AMux 610, BMux 611
RMux 603 and tri-state buffer 607
QMux 608 and QRegister 609
Processor Status Word (PSW) Register 613
Program Counter 601
Scalar Stack Pointer 602
Interrupt Stack Pointer 621
Address Register 614
Scalar Memory Bus B 616 to its Register Bank 604 and to the Crossbar Switch for writing data to the Data Cache Register Bank The Register Bank 604 has 32 locations, some of which are not used because some dedicated registers are used, such as for the Program Counter 601. The Register Bank is implemented from a triple-port SRAM that is wired to provide one read port, A, driving the ALatch 605, and one read/write port, B, driving the BLatch 606 and being driven by the tri-state buffer 607. In a single cycle of the CPU Clock 124, two locations, A and B, can be read and location B can be updated. The A and B ports of the Register Bank- are addressed by bits in the Instruction Word.

The various control registers in the ports as 102 and 103 of the Parallel DSP Chip are treated as extended, or additional, scalar registers. Counting the Register Bank and registers shown in FIG. 6 and the extended registers, six bits are required to address them. However, only five bits of the Scalar A Address and Scalar B Address are provided in the Instruction Word to minimize the size of the instruction word. Since the extended registers are used infrequently, they are not accessible from most instructions and special instructions are necessary to access them. See the description of the Instruction Word.

Since the data storage elements in the Register Bank are level sensitive not edge sensitive, and since a read-modify-write operation can be performed in a single clock cycle, two transparent latches 605 and 606 are provided to separate read and write operations lest data being read be corrupted by data being written. During the first half of the clock cycle, data from the Register Bank is passed through the ALatch 605 and the BLatch 606 for immediate use by the ALU 612 and Address Register 614, and the write logic, including the buffer 607, is disabled. During the second half of the clock cycle, the data in the latches is held and the write logic is enabled.

ALU

The ALU has two, 24-bit inputs, from the AMux 610 and the BMux 611, and a Carry Input (Cin) 623 from the PSW Register 613. The ALU has 16-functions that support common arithmetic and Boolean operations. The functions are described in the section on the Instruction Word.

The AMux 610 and BMux 611 select among the many possible inputs to the ALU as shown in FIG. 6. The output of the ALU forms Scalar Memory Bus B 616 which sends data to the Crossbar Switch.

Among the inputs are:
Connection 620 to the Instruction Unit for obtaining immediate data
Connection 618 to the Instruction Cache for obtaining scalar data
Connection 619 to the Crossbar Switch for reading data from the Data Cache
Connection 622 to the extended Scalar registers Address Register The Scalar Processor is controlled by the Instruction Unit 105, like the Vector Processors, and operates in parallel with the Vector Processors in lock-step since the Vector Processors 110 to 113 and Scalar Processor 107 are all controlled from the same instruction. Its Address Register 614 addresses memory via the Address Bus 615. When operands are being fetched for the Vector Processors, the address is used by the Data Cache 108. When operands are being fetched for the Scalar Processor, the address is used by the Instruction Cache 104. The Program Counter 601 in the Scalar Processor addresses the Instruction Cache for instruction fetches.

The Address Register 614 is loaded directly from the output of the BMux 611 which feeds the S input of the Scalar ALU 612. This supports post-fix operations for generating addresses. Such operations are common in compilers for the C language. Post-fix operations are identified by the fact that the operand is used before it is updated, i.e., if X+1–>X, then the value of X prior to being incremented is used by the Address Register 614.

All external memory 501 is addressed uniformly, as a part of the same memory address space. Thus the Instruction Cache 104 and Data Cache 108, which contain images of different portions of the external memory 501, are all addressed the same. The Scalar Processor has a 24-bit word width to address a maximum of 16 MB of RAM. Although the smallest data element that can be addressed is 16 bits, the lsb of the address represents an 8-bit byte to maintain compatibility with future chips.

A single memory address generated by the Scalar Processor is used simultaneously by all of the Vector Processors. So that a 64-bit word can be obtained from the Data Cache in a single cycle for maximum performance; the addresses for use by the Vector Processors must be on 8-byte boundaries for quadruple word operations (_quad_short) and 4-byte boundaries for quadruple byte operations (_quad_char). Relative to such an 8-byte boundary, Vector Processor N receives the memory data byte at offset N, and Vector Processor N receives the memory data word at offset 2N for word operations.

QMux and QRegister

The Scalar Processor can implement multiply and divide using shift-and-add or shift-and-subtract algorithms using the QMux 608, QRegister 609 and RMux 603. Each operation requires an instruction. There is no microprogrammed sequencer in the Parallel DSP Chip.

RMux

The RMux 603 is used to pass the output of the ALU 612 to the Register Bank 604 in one of three ways, straight through (default), shifted up by one bit or shifted down by one bit. The shift capability is used in multiply and divide algorithms, and for shift and rotate instructions.

Processor Status Word (PSW) Register

The PSW Register 613 stores the ALU status bits, carry, negative, zero and overflow, from the ALU 612, additional bits from throughout the Parallel DSP Chip, and bits to control the selection of registers in the Vector Processors. These many bits are described in the section on the Instruction Word. The PSW Register can be directly addressed as a Scalar register so it can be loaded from the output of the ALU, which is used when a return from interrupt occurs and to initialize the state of the ALU status bits.

Stack Pointers

Three stack pointers are provided, one each for the Scalar Processor, the set of Vector Processors, and the Instruction Unit. All are implemented as registers in the Scalar Processor. The corresponding scalar stack, vector stack and interrupt stack are all software entities that are implemented in memory as 501 at a location chosen by the programmer, and can be of any size within the limits of the amount of memory available.

A scalar stack pointer register is provided for the pushing and popping of scalar operands to the scalar stack. Scalar operands come only from the Scalar Processor. The scalar stack pointer is a self incrementing and decrementing counter to avoid the use of the ALU in the Scalar Processor since the use of the Scalar ALU is required to move data to and from memory.

The vector stack pointer is provided for the pushing and popping of vector operands. Vector operands come only from the Vector Processors. The vector stack pointer is implemented using one of the registers in the Scalar Processor. Since it is one of the scalar registers it is not self incrementing and decrementing. However, this is not necessary since the scalar ALU can perform the necessary calculations, increment or decrement by 8, while the vector processors do memory operations to and from the vector stack.

"Push" and "pop" instructions are provided for operations with the scalar stack pointer and vector stack pointer. The addresses of these stack pointer registers are built into these instructions. Additional vector stack pointers and scalar stack pointers can be implemented by software if desired using scalar registers; however, the user would be responsible for implementing stack address updates. In all cases, vector stacks are in vector memory and scalar stacks are in scalar memory.

The interrupt stack pointer is provided for the pushing and popping of processor status during interrupts. Processor status comes from the Scalar Processor and the Instruction Unit. Interrupts use the interrupt stack pointer to store processor status information so that a return from interrupt to the previously executing code is possible. It is a self-incrementing counter to avoid the use of the ALU in the Scalar Processor while data is being read from, or written to, memory.

6.1.8 Data Cache

The two-way, set-associative Data Cache 108 buffers memory transfers between the external memory as 501 via the Memory Interface 101 and the Vector Processors 110 to 113. It operates with different clocks on these two ports, the Memory Clock 123 on the memory bus side and the CPU Clock 124 on the processor side.

The implementation of the Data Cache 108 is substantially the same as the implementation of the Instruction Cache 104.

When the Vector Processors perform a memory read or write operation, tile address generated by the Scalar Processor is compared to the address stored in the Data Cache. If the required memory data is already in the Data Cache, then use of the memory data proceeds immediately. If the memory data is not in the Data Cache, then operation of the Vector Processors is suspended and a page of data must be read from external memory as 501. However, if the page in the Data Cache that is to be loaded has been modified by the Vector Processors, i.e., is dirty, then the page must be written to external memory before the new page can be loaded The replacement algorithm is Least Recently Used, except for the locked pages which are permanently resident. In the case of a two-way, set-associative cache, the LRU replacement algorithm determines that if a new page is needed then one of two pages for the selected cache line is determined to be older, i.e., least used, and is chosen for replacement.

The Data Cache supports page locking in a similar manner as the Instruction Cache. Extended instructions are provided for locking and unlocking vector memory. The v_lock instruction requests a page in the data cache to be locked and the v_unlock requests that a page be unlocked.

External memory can be thought of as being 64 bits wide, forming a superword. The 8 bytes of this word occupy eight consecutive byte addresses. I maintain addressability down to the byte level even though the smallest data item that can be manipulated by the Scalar Processor is 16-bits and the small data item that can be manipulated by the Vector Processors is the 32-bit, _quad_char. The proper placement of data into external memory is mandatory since I do not support the fetching of data for use by the Vector Processors that is not on a 4-byte boundary for a _quad_char or an 8-byte boundary for a _quad_short.

The Data Cache has a capacity of 1K bytes, physically organized as 128 words by 64 bits so that four, 16-bit operands can be accessed by the Vector Processors at one time. This amount of storage is logically organized as 16 pages of 64 bytes each. Thus memory transfers are done with a block size of 64 bytes.

The Data Cache is implemented as a dual-port memory. This enables it to be loaded from the internal memory bus 117 while it is read by the Vector Processors. It supports the use-as-fill operation found in the Instruction Cache.

6.1.9 Crossbar Switch

Figure 7:
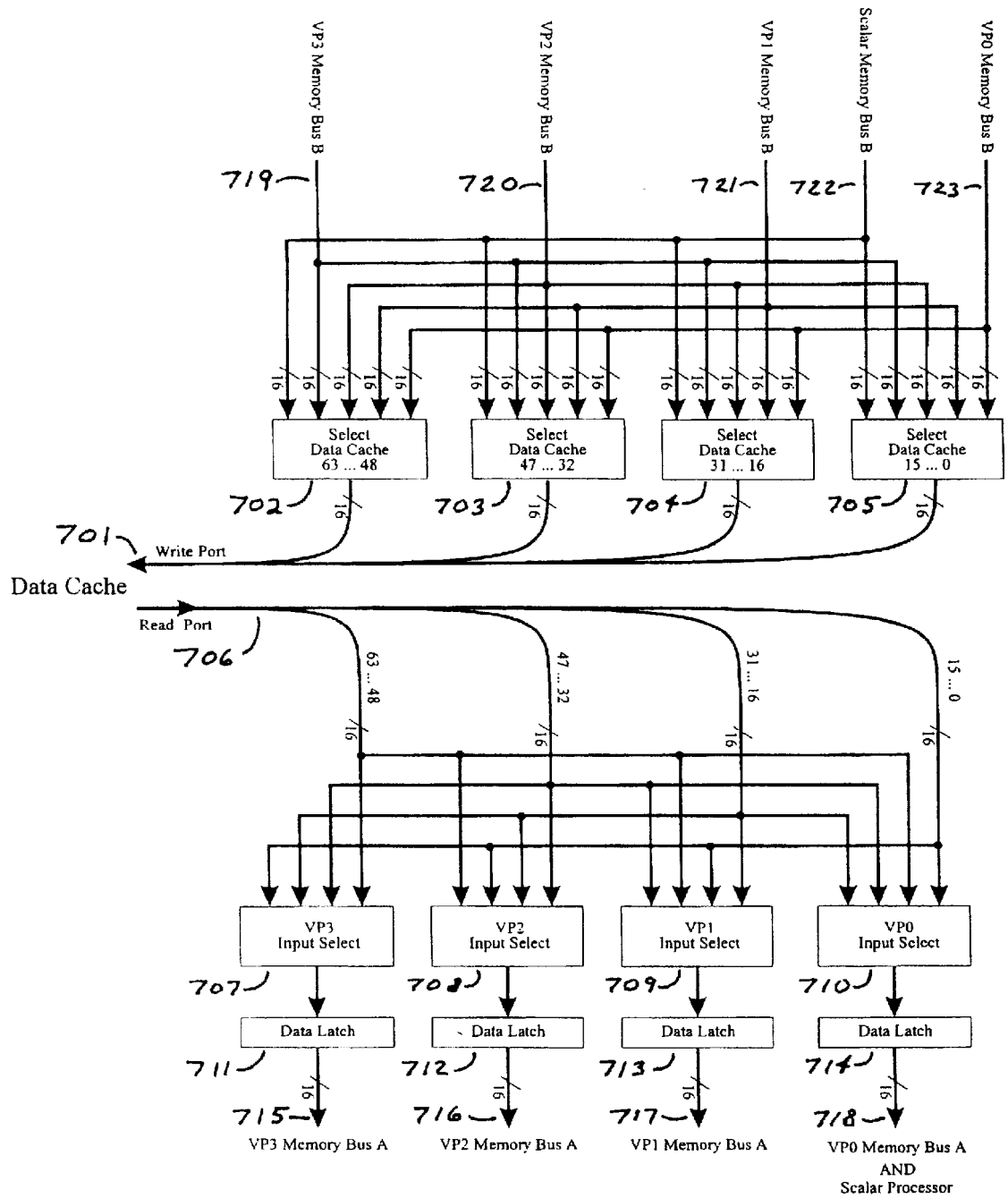
FIG. 7 is a block diagram of the Crossbar Switch within the preferred embodiment of the Parallel DSP Chip according to this invention.

The Crossbar Switch 109 assists in the sharing of data among the Vector Processors and between the Vector Processors and Scalar Processor via memory. In the Parallel DSP Chip, there are no data paths between the Vector Processors; data is passed between them via memory using the Crossbar Switch and Data Cache. By passing data through memory, the representation of the passage of this data can be done easily in a high level language. A block diagram of the Crossbar Switch is shown in FIG. 7.

The Crossbar Switch 109 performs these functions:

Pass data directly from the Data Cache to the Vector Processors (default operation) as though the Crossbar Switch were not present Reassign connections between the Data Cache and the Vector Processors (e.g., to rotate data among the Vector Processors via the Data Cache)

Replicate the data from a selected Vector Processor throughout a 64-bit, Data Cache memory word (e.g., to broadcast data from a Vector Processor to the Data Cache)

Pass data from a portion of a 64-bit, Data Cache memory word to the Scalar Processor (e.g., to pass data from a Vector Processor to the Scalar Processor via the Data Cache)

Replicate data (the 16 lsbs) from the Scalar Processor throughout a 64-bit, Data Cache memory word (e.g., to broadcast data from the Scalar Processor to the Vector Processors via the Data Cache)

The connection "straight through" the Crossbar Switch 109 is as follows, where the 64-bit, Data Cache Bus is shown as 125 and the 64-bit, Vector Processor Bus is shown as 128:

Vector Processor Bus bit N=Data Cache Bus bit N, for N=0 to 63

Vector Processor 0 (110) receives Vector Processor Bus bits 15 . . . 0 (bit 15, msb, through bit 0, lsb)

Vector Processor 1 (111) receives Vector Processor Bus bits 31 . . . 16

Vector Processor 2 (112) receives Vector Processor Bus bits 47 . . . 32

Vector Processor 3 (113) receives Vector Processor Bus bits 63 . . . 48

Each of the four Vector Processors has a logical bi-directional; 16-bit bus as shown in FIG. 1 that is implemented as two, 16-bit, unidirectional buses. VPN Memory Bus A as 815 moves data from the Data Cache into Vector Processor N via the Crossbar Switch. VPN Memory Bus B as 816 moves data from Vector Processor N to the Data Cache via the Crossbar Switch. Note that VPN may also be shown as VP(n).

For interprocessor operations to execute quickly, one page of the memory can be locked in place in the Data Cache. Otherwise, the use of the Data Cache to transfer data among the processors may result in a cache miss, slowing execution speeds The Crossbar Switch is implemented from eight, unidirectional multiplexers, 702 to 705 and 707 to 710. It is logically organized in two parts, a Data Cache read section and a Data Cache write section. Since the Data Cache cannot be read and written by the Vector Processors at the same time, the Data Cache Write Bus, or port, 701 and the Data Cache Read Bus, or port, 706, can be connected together to form the 64-bit bus 125 to/from the Data Cache.

The buses used are:

Data Cache Read Bus, 706, 64 bits wide

Data Cache Write Bus, 701, 64 bits wide

Vector Processor N Memory Bus A, for N=0 to 3, 718, 717, 716, and 715 respectively, each 16 bits wide Vector Processor N Memory Bus B, for N=0 to 3, 723, 721, 720, and 719 respectively, each 16 bits wide Scalar Processor Memory Bus A, 718, 16 bits wide Scalar Processor Memory Bus B, 722, 16 bits wide In all cases, information is passed among the processors via memory. First, one or more operands are written to a memory location that has been chosen by the programmer for the passing of data among the processors. Second, that same memory location can be read and the information passed to the desired processor or processors, with or without a shift between processors.

Reading from the Data Cache

VPN Memory Bus A as 718 for each Vector Processor as 110, which reads data from the Data Cache 108, has a 4-input mux (multiplexer) as 710. Data is passed through a transparent latch as 714 that is set to pass data during the first portion of each cycle of the CPU Clock 124. The control lines to all muxes 707 to 710 and 702 to 705 are controlled by the Instruction Unit 105. The wiring of the inputs varies from mux to mux. These muxes facilitate the sharing of data among the processors and the broadcasting of data from a portion of a 64-bit word in the Data Cache to all Vector Processors.

The outputs of these muxes 707 to 710 are passed through transparent latches 711 to 714 like the ones found at the output of the Register Bank 801 in a Vector Processor as 110. These latches form a memory data register. The outputs of the latches are passed to all of the processors. To support some signal processing algorithms such as convolution, selectable portions of these latches can be loaded to read only parts of 64-bit words from the Data Cache.

The inputs to VP0 (Vector Processor 0) Read Mux 710 are:

0—Data Cache bits 15 . . . 0 (rotate 0 up=straight through)
1—Data Cache bits 31 . . . 16 (rotate 1 up=advance by one Vector Processor)
2—Data Cache bits 47 . . . 32 (rotate 2 up=advance by two Vector Processors)
3—Data Cache bits 63 . . . 48 (rotate 3 up=advance by three Vector Processors)

Output latch 714 that is connected to the VP0 Read Mux 710 is also connected to the input of the muxes 610 and 611 in the Scalar Processor via the bus 718 to facilitate communications between the Scalar Processor and any of the Vector Processors.

The inputs to the VP1 Read Mux 709 are:

0—Data Cache bits 31 . . . 16 (rotate 0 up=straight through)
1—Data Cache bits 47 . . . 32 (rotate 1 up)
2—Data Cache bits 63 . . . 48 (rotate 2 up)
3—Data Cache bits 15 . . . 4 (rotate 3 up)

The inputs to the VP2 Read Mux 708 are:

0—Data Cache bits 47 . . . 32 (rotate 0 up=straight through)
1—Data Cache bits 63 . . . 48 (rotate 1 up)
2—Data Cache bits 15 . . . 0 (rotate 2 up)
3—Data Cache bits 31 . . . 16 (rotate 3 up)

The inputs to the VP3 Read Mux 707 are:

0—Data Cache bits 63 . . . 48 (rotate 0 up=straight through)
1—Data Cache bits 15 . . . 4 (rotate 1 up)
2—Data Cache bits 31 . . . 16 (rotate 2 up)
3—Data Cache bits 47 . . . 32 (rotate 3 up)

By appropriate selection of the control lines to the muxes by an instruction, a memory broadcast from any 16-bit location can be achieved.

Writing to the Data Cache

The 64-bit, Data Cache Write Bus 701 is formed from four, 16-bit data paths that are the outputs of four muxes 702 to 705. Each of these four muxes has five inputs. Each of the four Vector Processors and the Scalar Processor are wired to one of the five inputs of each mux. The control lines to all muxes are controlled by the Instruction Unit 105. These muxes allow any one Vector Processor to broadcast to the other Vector Processors by replicating data in the Data Cache. The Scalar Processor does not broadcast but can write to any 16-bit location, hence any Vector Processor, using the mux.

Data can be written into the 64-bit Data Cache in 16-bit groups, rather than requiring that only entire 64-bit words be written. Each 16-bit group corresponds to the 16 bits from one of the Vector Processors. Each of the Vector Processors has a Processor Enable bit that can control whether or not a write to memory updates a corresponding 16-bit portion of the Data Cache.

Writing into the Data Cache from the Vector Processors is controlled as follows:

Broadcast from one Vector Processor—replicate one 16-bit word from a selected Vector Processor into all 64 bits of the addressed 64-bit word in the Data Cache, writing the 16-bit word only into the portions of the 64-bit word for which the respective Vector Processors are active Write from Scalar Processor—write one 16-bit word (16 lsbs of the 24-bit word) from the Scalar Processor into one 16-bit portion of the addressed 64-bit word in the Data Cache Writing from Vector Processors—write a 16-bit word from each of the active Vector Processors into the addressed 64-bit word in the Data Cache, writing up to 64 bits at one time The inputs to the Data Cache 15 . . . 0 Write Mux 705 are:

0—Vector Processor 0 Memory Bus B bits 15 . . . 0
1—Vector Processor 1 Memory Bus B bits 15 . . . 0
2—Vector Processor 2 Memory Bus B bits 15 . . . 0
3—Vector Processor 3 Memory Bus b bits 15 . . . 0
4—Scalar Processor Memory Bus B bits 15 . . . 0

The inputs to Data Cache 31 . . . 16 Write Mux 704, Data Cache 47 . . . 32 Write Mux 703, and Data Cache 63 . . . 48 Write Mux 702 are the same as the inputs to Data Cache 15 . . . 0 Write Mux 705.

6.1.10 Parallel Arithmetic Unit

Figure 8:
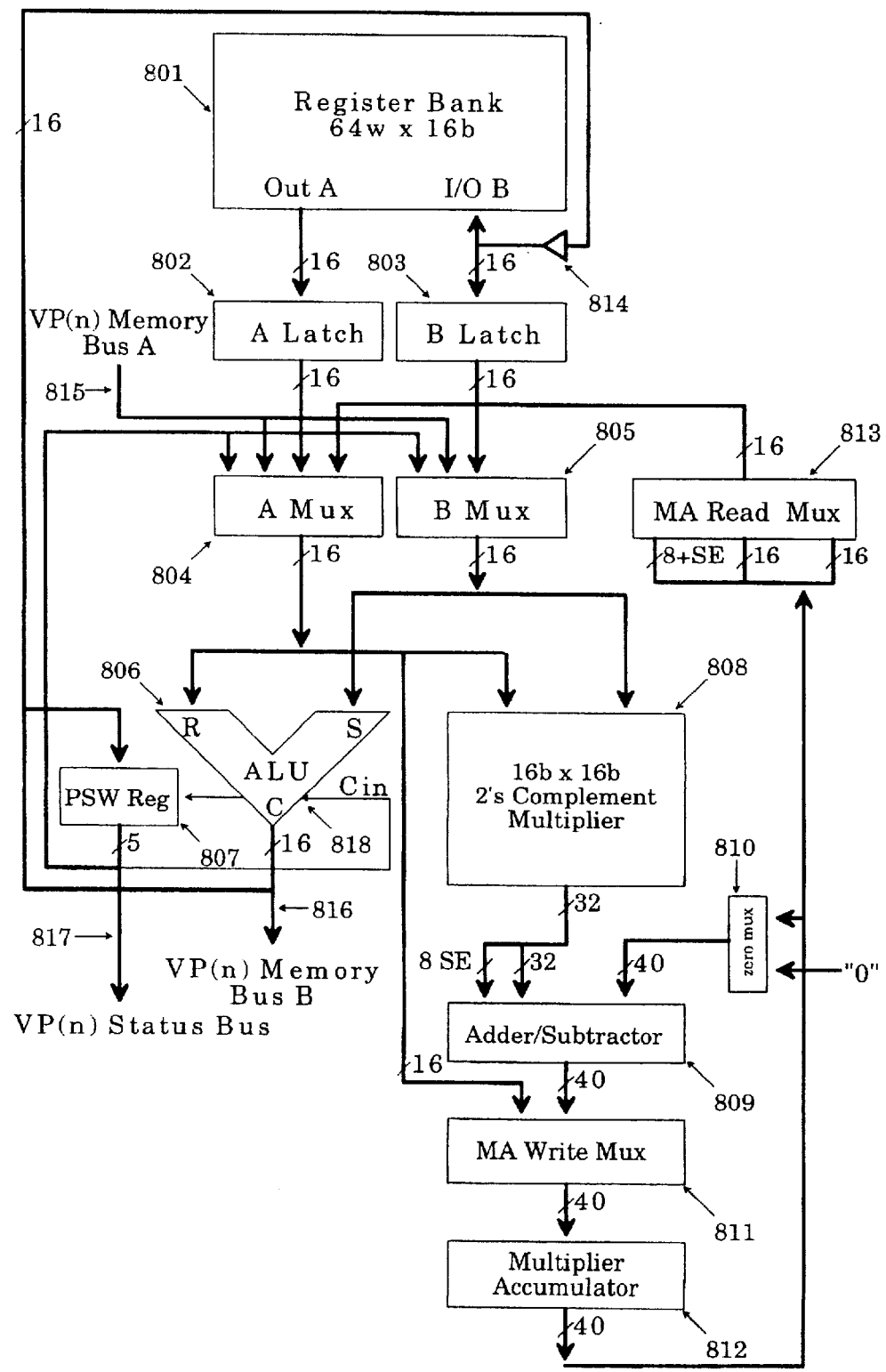
FIG. 8 is a block diagram of a Vector Processor within the preferred embodiment of the Parallel DSP Chip according to this invention.

The Parallel DSP Chip has four, 16-bit Vector Processors 110 to 113, labeled Vector Processor 0 (VP0 or VP(0)) to Vector Processor 3 (VP3 or VP(3)). Collectively, they form the Parallel Arithmetic Unit. All elements are controlled in parallel by the Instruction Unit 105. The block diagram of a Vector Processor as 110 is shown in FIG. 8.

Each Vector Processor has:

Dual-port Register Bank 801 with one read port and one read/write port
ALatch 802 and BLatch 803
AMux 804 and BMux 805
ALU 806
Processor Status Word (PSW) Register 807
Multiplier 808
Zero Mux 810
Adder/subtractor 809
Multiplier/accumulator Write Mux 811
Multiplier/accumulator Register 812
Multiplier/accumulator Mux 813
Register Bank The Register Bank 801 has 64 locations. It is implemented from a triple-port SRAM that is wired to provide one read port, A, driving the ALatch 802, and one read/write port, B, driving the BLatch 803 and being driven by the tri-state buffer 814. In a single cycle of the CPU Clock 124, two locations, A and B, can be read and location B can be updated.

The A and B Ports of the Register Bank are addressed by the Instruction Word. However, only five bits of A Address and B Address are provided in the Instruction Word. Register Windows are provided to remap the five bits from the Instruction Word to the six bits required by the Register Bank. See the description of the Instruction Word.

Since the data storage elements in the Register Bank are level sensitive not edge sensitive, and since a read-modify-write operation can be performed in a single clock cycle, two transparent latches 802 and 803 are provided to separate read and write operations lest data being read be corrupted by data being written. During the first half of the clock cycle, data from the Register Bank is passed through the ALatch 802 and the BLatch 803 for immediate use by the ALU 805, and the write logic, including the buffer 814, is disabled. During the second half of the clock cycle, the data in the latches is held and the write logic is enabled.

ALU

The ALU 806 has two, 16-bit inputs, from the AMux 804 and the BMux 805, and a Carry Input (Cin) 818 from the PSW Register 807. The ALU has 16-functions that support common arithmetic and Boolean operations. The functions are described in the section on the Instruction Word.

The AMux 804 and BMux 805 select among the several possible inputs to the ALU as shown in FIG. 8, including the VP(n) Memory Bus A 815 which receives data from the Crossbar Switch 109. The output of the ALU forms the VP(n) Memory Bus B 816 which sends data to the Crossbar Switch.

The data paths of the Vector Processors are 16-bit. However, during vector ALU byte operations that involve memory accesses, only the lower 8-bits are significant. When a byte read from memory occurs, bit 7 is sign extended to form a 16-bit quantity if the sign extend bit in the scalar status register is set. The most significant byte is cleared otherwise. When a byte write to memory occurs, the upper 8-bits are truncated to form a byte from the lower 8 bits of the word.

The two connections to the Crossbar Switch, shown as VP(n) Memory Bus A 815 and VP(n) Memory Bus B 816, facilitate the reading and writing of main memory, the passing of data among the Vector Processors via the Data Cache, and the passing of data between the Scalar Processor and the Vector Processors via the Data Cache. Data coming from the Crossbar Switch to a Vector Processor is on VP(n) Memory Bus A. Data going to the Crossbar Switch from a Vector Processor is on VP(n) Memory Bus B.

Processor Status Word (PSW) Register

The PSW Register 807 stores the ALU status bits, carry, negative, zero and overflow, from the ALU 806, and a Processor Enable bit.

The Processor Enable bit controls whether or not a Vector Processor updates its registers and Register Bank when an instruction is executed, and whether or not its output is written to the Data Cache. The Processor Enable bit is used to allow data-dependent operations to be performed by the Vector Processors, wherein none, some or all of them will be inactive as a result of some test operation, and conversely, all, some or none of them will be inactive.

The conditions, which are based upon the carry, negative, zero and overflow outputs from the ALU, that control the Processor Enable bit have been chosen to optimize the implementation of arithmetic and Boolean test operators in common high level languages, as described in the section on the Instruction Word. Only certain instructions modify the Processor Enable bit. An instruction is provided to set all of the Processor Enables bits in all of the Vector Processors and thereby enable all of the Vector Processors regardless of the state of their Processor Enable bits.

The PSW Register can be directly addressed as a Vector register so it can be loaded from the output of the ALU to initialize the state of the ALU status bits.

Multiplier/Accumulator

Unlike the Scalar Processor that is rarely required to perform multiplication, the Vector Processors are often required to perform multiplication and thus must do it quickly.

The combinatorial, hardware Multiplier 808 handles two, 16-bit, 2's complement operands, one from the AMux 804 and one from the BMux 805. For maximum performance, one operand can be read from memory and passed to the Multiplier on every cycle using a series of addresses computed by the Scalar Processor, with the other operand coming from the Register Bank 801. This is useful for matrix-vector multiplication.

The Multiplier has one stage of pipelining to increase execution speed. The output of the Multiplier 808 flows through an Adder/Subtractor 809 so that sums and differences of products can be computed. The output of the Adder/Subtractor flows through the Multiplier/Accumulator Write Mux 811 so that the Multiplier/Accumulator can be initialized to a value provided by the AMux 804. The Multiplier/Accumulator 812 produces a 40-bit result.

When the Parallel DSP Chip is performing a multiply instruction, writing into the 16-bit Register Bank 801 is inhibited because the 32-bit product is sign-extended and added to the contents of the Multiplier/Accumulator 812 and written into the 40-bit Multiplier/Accumulator 812. Due to pipelining, the product is delayed by a cycle, therefore the Register Bank is write inhibited for one extra cycle following a multiply instruction. On the subsequent and later cycles, 16 bit portions of the Multiplier/Accumulator can be written to the Register Bank 801 or memory to store the product.

A Zero Mux 810 has been provided to essentially clear the Multiplier/Accumulator 812 without the use of a cycle. This is achieved by forcing zero into one of the inputs of the Adder/Subtractor 809. This is useful for multiplying two numbers without adding to a prior sum, i.e., ((A times B) plus 0). The Vector Multiply Word and Vector Multiply Byte instructions use the Zero Mux to implement the multiply and clear accumulator options.

Unlike the Scalar Processor, the Vector Processors have no dedicated shift-and-add logic since they have a hardware multiplier and rarely need to perform divisions. Shifting and rotating can be performed using the Multiplier. Divisions can be performed by polynomial expansions in the Vector Processors or by the Scalar Processor.

Timing

The nominal frequency of the CPU Clock 124 is 40 MHz. The following operations are performed in a single clock cycle:

1. An instruction is clocked into the Vector Instruction Register
2. In each Vector Processor, the A and B addresses access the Register Bank 801
3. In each Vector Processor, data in the Register Bank passes through the A and B Latches 802 and 803
4. In each Vector Processor, data in the A and B Latches pass through the A and B Muxes 804 and 805
5. In each Vector Processor, an ALU operation is performed, the worst case operation is an Add or Subtract as a result of the carry chain
6. In each Vector Processor, the output of the ALU 806 is written back into the Register Bank 801 at the B Address 6.1.11 Serial Port The Serial Port 114 supports the RS-232 protocol and communicates with an external device via the Serial I/O connection 122. A programmable baud rate is provided with the aid of a register and counter in the Serial Port that divide the CPU Clock by a programmable amount. An interrupt is generated when a character is sent or received.

6.1.12 Parallel DMA Control Port

The design of the Parallel DMA Control Port 115 is substantially the same as the design of the Parallel DMA Data Ports. The Parallel DMA Port communicates with an external device using the Parallel I/O bus 120. To save package pins, not all functions in all of the various types of Parallel DMA Ports are connected to pins, resulting in differences in the intended uses of these ports.

Serial EEPROM

In the Parallel DMA Control Port, a serial connection 121 to an external, serial EEPROM is also provided for loading a bootstrap program into the external memory when the Parallel DSP Chip is reset. The serial EEPROM can also be loaded from the Parallel DMA Port so that it can be, updated as needed.

Data is stored in the serial EEPROM using the same format used to load packets into the Parallel DMA Ports, but in serial form. When the Parallel DSP Chip is reset, program execution is suspended and the Parallel DMA Control Port automatically reads the serial EEPROM, deserializing each word received and handling each packet in turn. Once deserialized, each word is handled as though it had been received from the Parallel I/O bus 120. Reading of the contents of the serial EEPROM continues until a packet is received having a header with a byte count of zero, at which point reading of the serial EEPROM stops and program execution is begun.

6.2 Instruction Set 6.2.1 Introduction

The Instruction Unit 105 provides a general purpose, 32-bit, instruction set for digital signal processing. Wherever possible, the bits in the instruction word directly operate the data paths in the Parallel DSP Chip. Most instructions operate at the rate of one instruction per cycle of the CPU Clock 124. A short instruction pipeline simplifies compiler and application development. I have followed a RISC philosophy, making the compiler responsible for the proper handling of delayed program branches, delayed generation of memory addresses and selection of Register Windows.

There are only two instruction lengths, 32 bits for Basic Instructions and 64 bits for Extended Instructions. To simplify decoding, the format of Extended Instructions is an extension of the format of Basic Instructions, leaving the definitions of the fields in the 32 lsbs of the 64-bit instruction word unchanged.

Only a few bits are required for the opcode fields because control of the data paths is specified in other fields. In a Basic Instruction, two opcode fields are provided to specify the operation of the Scalar ALU and the Vector ALUs and multiplier. Also, two sets of fields specify not only register addresses but also the operations to be performed, such as memory and the Multiplier/Accumulator, when certain locations are specified.

However, drawing upon the Parallel DSP Chip's origins in Reduced Instruction Set Computing, no complicated address calculations are provided as complex instructions. Address calculations must be explicitly programmed.

An opcode modifier field is provided to change the interpretation of the opcode bits. For example, during a vector multiply, the Vector Processors' ALUs are not used and therefore the opcode field is used to specify a multiply operation rather than an ALU operation.

Extended Instructions, which are 64-bits long, are used in a few cases, such as for transfer-of-control and to provide immediate operands to implement generalized transforms. They must be stored on 8-byte boundaries so they can be accessed in their entirety in the 64-bit wide Instruction Cache in a single cycle.

By generalized transforms I mean that the sequences of addresses required to address the operands required to implement transforms in general, such as FFTs (Fast Fourier Transforms), are programmed, rather than being implemented by special hardware. This can be done efficiently in the Parallel DSP Chip using Extended Instructions. Half of the instruction specifies the arithmetic operation and the other half specifies the memory address and additional opcode bits. Thus irregular sequences of addresses that would be awkward and slow to compute can simply be stored as immediate operands in the instructions, although this takes additional memory and Instruction Cache bandwidth, which is available in the Parallel DSP Chip.

A novel feature of my SIMD architecture is that the operations of the Scalar Processor 107 and Vector Processors 110 to 113 are locked together in each instruction word. Rather than having different instruction streams for the Scalar Processor and the Vector Processors, my instruction set specifies the operation of both sets of processors in the same instruction word.

Common uses for this locked structure are:

Calculation by the Scalar Processor of a memory address used by the Vector Processors while the Vector Processors are operating upon the data read from memory Computation by the Scalar Processor of loop counts while the Vector Processors are operating upon data Computation by the Scalar Processor of a jump address while the Vector Processors are operating upon data Passing data between the Scalar Processor and Vector Processors The instruction execution rate and data processing rate are determined by the CPU Clock 124. As a result of the use of a 64-bit wide Instruction Cache 104, most instructions, regardless of their length, execute at the rate of one per clock cycle.

A 24-bit Program Counter 601 is provided in the Scalar Processor 107. It operates in parallel with the Vector Processors and Scalar Processor. It is treated like a general purpose register for manipulation by the Scalar Processor but can be updated independently for routine instruction fetching. Three pushdown stacks can be used, one for scalar operands, one for vector operands and one for interrupts. The stack pointers for the scalar operands and the interrupts are implemented by register/counters so they can be updated without the use of the ALU in the Scalar Processor for increased performance.

Other features of the Instruction Set are:

Handling of interprocessor communication via Crossbar Switch and memory

Ease of programming in high level languages such as an enhanced version of C

Use of Register Windows for Vector Processors

In the Vector Processors Control field, the key points of the Basic Instruction Word are the explicit references to the Carry FF (Carry Flip-flop) in the ALU Operation field, and the combined memory access and control of the Multiplier/Accumulator by the A Address and B Address fields.

In the Vector Processors, the following operations can occur in a single clock cycle:

operand #1 is read from the data cache operand #2 is read from the register bank the operands are multiplied together the product is accumulated At the same time, the Scalar Processor can compute the memory address used for the next cycle and the Instruction Unit can update the program counter and fetch the next instruction.

I have minimized the number of bits required in the instruction word by the use of Register Windows in the Vector Processors. For maximum speed, the registers in the Scalar Processor are directly addressed. A portion of the Processor Status Word, PSW, in the Scalar Processor sets the high-order register address bits that selects a group of registers in the Vector Processors for access. There are 32 registers in the window, and the window can be moved in increments of eight registers. Of the 32 registers in the window, some of the registers can be accessed regardless of the choice of the window, while others depend upon the choice of the window. To minimize the size of the windows, the uses of some of the registers within a window vary with the choice of window.

To increase the performance from the multiplier in a Vector Processor as 110, all the multiply instructions, Multiply, Multiply/Add, and Multiply/Subtract, write their product to the Multiplier/Accumulator as 812 on the next cycle. Because the product is written to the Multiplier/Accumulator, all writes to a Vector Processor's Register Bank- as 801 are inhibited during multiply instructions. If a product must be written to the Register Bank, the contents of the 40-bit Multiplier/Accumulator must be written in 16-bit portions to a specified location in the Register Bank on the cycles following the multiply instruction. An extra cycle is necessary for a product to clear the multiplier pipeline and get stored in the Multiplier/Accumulator.

In addition, all instructions can be executed conditionally in the Vector Processors. The Vector Processor, Processor Status Word, which is stored in the PSW Register as 807 in each of the Vector Processors, has a Processor Enable Bit. This bit is normally true, enabling the Vector Processor to operate. Certain instructions cause unconditional operation of the Vector Processors so the Processor Enable Bits can be manipulated regardless of current state. By causing Processor Enable Bits to be cleared in response to the operation of a test instruction, any combination of Vector Processors can be inactivated. Vector operations such as complement if negative can be implemented.

6.2.2 Instruction-Word Bit Assignments

Basic Instructions

Figure 9:
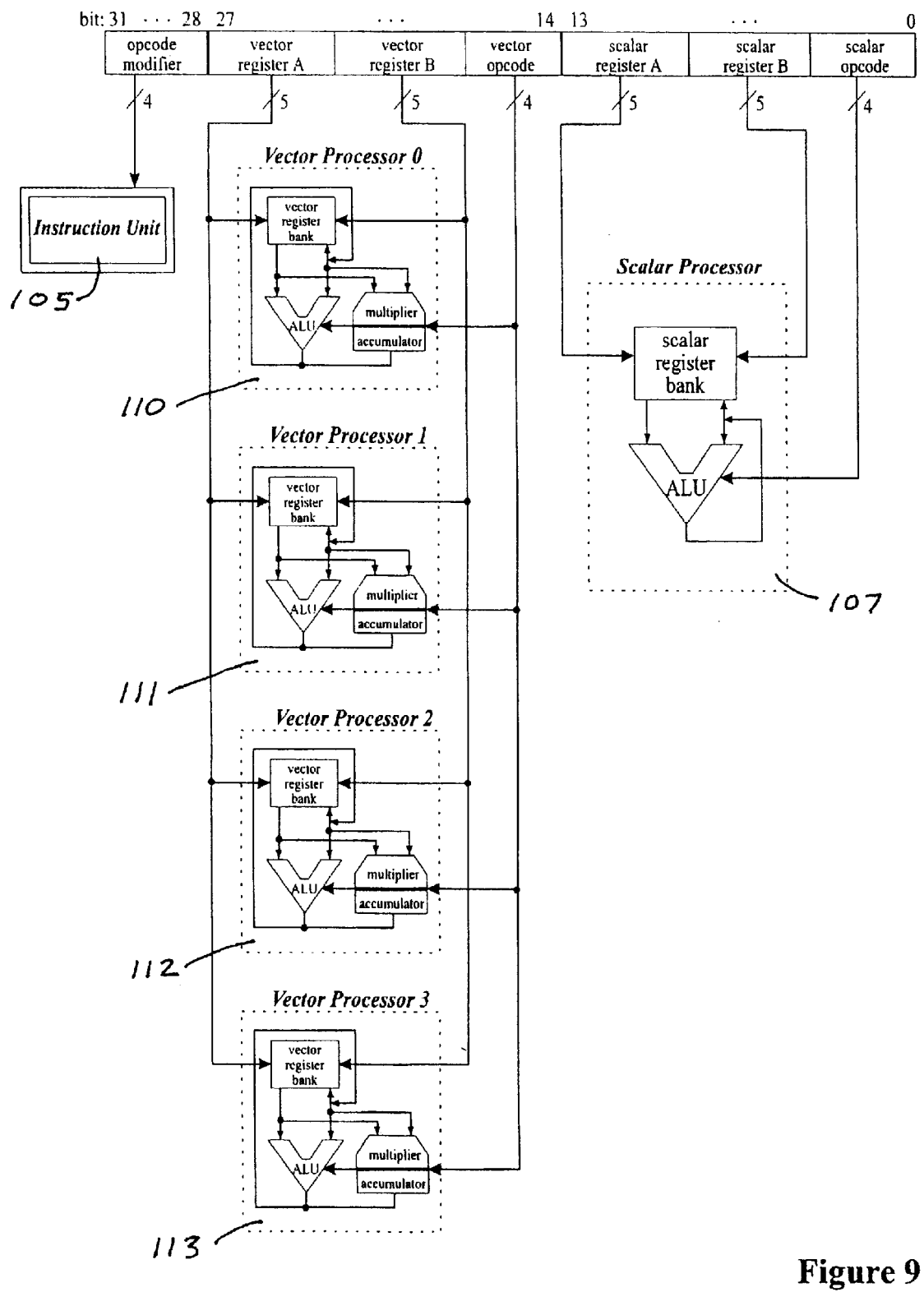
FIG. 9 is a drawing showing the usage of bits within the preferred embodiment of the instruction word for Basic Instructions within the Parallel DSP Chip according to this invention.

The usage of the bits in the 32-bit instruction word for a Basic Instruction is illustrated in FIG. 9. The connections of the opcode modifier field, bits 31 . . . 28, to the Instruction Unit 105, the vector register A, vector register B and vector opcode fields, collectively bits 27 . . . 14, to all of the Vector Processors 110 to 113 in parallel, and scalar register A, scalar register B and scalar opcode field, collectively bits 13 . . . 0, to the Scalar Processor 107 are shown to illustrate how I avoid the use of microcode and operate directly on the data paths in the Parallel DSP Chip wherever possible.

Extended Instructions

Figure 10:
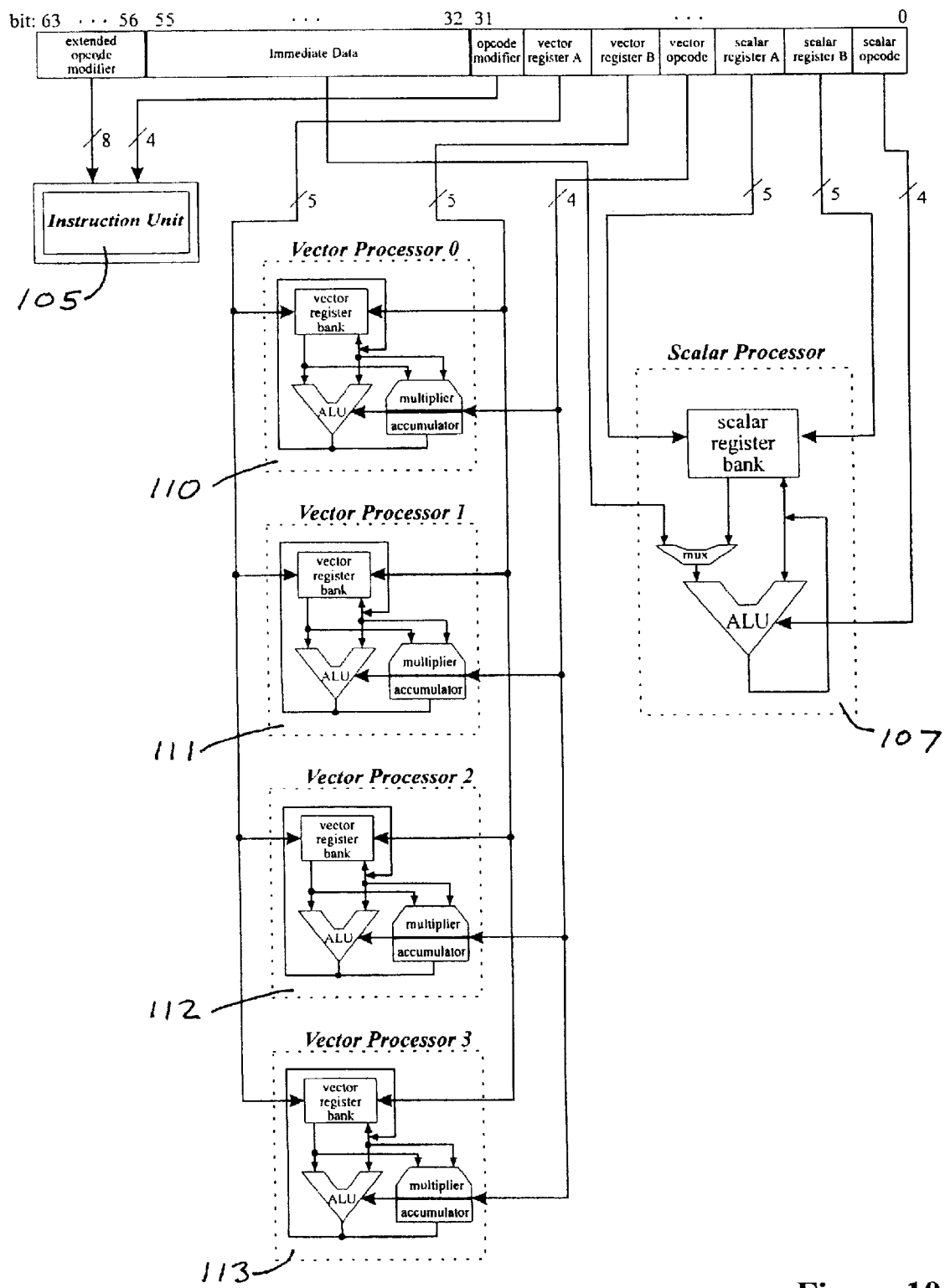
FIG. 10 is a drawing showing the usage of bits within the instruction word for Extended Instructions within the preferred embodiment of the Parallel DSP Chip according to this invention.

The usage of the bits in the 64-bit instruction word for an Extended Instruction is illustrated in FIG. 10. The distribution of the bits to the Instruction Unit and appropriate processors is shown to illustrate how the format of the Basic Instruction is extended by adding an additional opcode modifier and the ability to use immediate data. Thus, the usage of the fields in bits 31 . . . 0 of the instruction word of an Extended Instruction is the same as for the Basic Instruction, simplifying implementation and increasing execution speed. The additional fields provided by bits 63 . . . 32 of an Extended Instruction word provide additional bits for the Instruction Unit 105 and Immediate Data for use by the Scalar Processor 107.

6.2.3 Memory Addressing

A 24-bit memory address is used, with the least significant bit denoting a byte. All Basic Instructions, which are 32 bits long, must be located on 4-byte boundaries, and all Extended Instructions, which are 64 bits long, must be located on 8-byte boundaries. All quadruple 8-bit operands, \_quad\_char, used by the four Vector Processors in parallel must be on 4-byte boundaries. All quadruple 16-bit operands, \_quad\_short, used by the four Vector Processors in parallel must be on 8-byte boundaries.

All data is stored with the least significant byte first, i.e., with the least significant byte at the lowest address, and a word is shown with the most significant byte on the left. For example:

0000A0 (hex): 32,5A,C0,18,50,02,C0,18 (hex)

is the same as the following, with all values in hexadecimal (hex or "h") notation:

| Address | Contents | Bits of 64-bit Word Starting at A0h |
|---------|----------|-------------------------------------|
| 0000A0: | 18h      | 7 . . . 0                           |
| 0000A1: | C0h      | 15 . . . 8                          |
| 0000A2: | 02h      | 23 . . . 16                         |
| 0000A3: | 50h      | 31 . . . 24                         |
| 0000A4: | 18h      | 39 . . . 32                         |
| 0000A5: | C0h      | 47 . . . 40                         |
| 0000A6: | 5Ah      | 55 . . . 48                         |
| 0000A7: | 32h      | 63 . . . 56                         |

Interpreting the data above as instructions, the first instruction shown above is 5002C018h at address A0 and the second instruction is 325AC018h at address A4. The above instructions are Basic Instructions because bits 63 . . . 60 and bits 31 . . . 28 are not 1111b (Fh), which would indicate the opcode modifier chosen to signify "extend". Furthermore, the second instruction could not have been extended because it would not have been on an 8-byte boundary as the first was.

The Scalar Processor 107 computes all memory addresses for itself, the Vector Processors 110 to 113, and the Instruction Unit 105. However, the Program Counter 601 updates itself without assistance from the Scalar Processor for routine increments and transfers of control that do not require any computation.

When an instruction specifies a scalar operand, the operand must be on a 4-byte boundary.

When an instruction specifies 16-bit vector operands, a set of four, 16-bit operands, a \_quad\_short, must be on an 8-byte boundary. The use of 8-bit operands by the Vector Processors is more complicated, for it has two modes, byte-interleaved and non-byte-interleaved, where the choice of mode is determined by a bit in the Scalar Processor Status Word. In either case, the data type is a \_quad\_char. In non-byte-interleaved mode, when an instruction specifies 8-bit vector operands, a set of four, adjacent, 8-bit operands must be on a 4-byte boundary. In byte-interleaved mode, when an instruction specifies 8-bit vector operands, a set of eight, adjacent, 8-bit operands must be on an 8-byte boundary.

In the latter case, a 64-bit word containing the bytes {B7, B6, B5, B4, B3, B2, B1, B0} would be referenced as (B6, B4, B2, B2) with an value of "0" in the three lsbs of the address, and as {B7, B5, B3, B1} with a value of "4", not "1", in the three lsbs of the address because the interpretation of the address bits is changed so that an address pointer can increment by 4 regardless of whether byte-interleaved or non-byte-interleaved mode is used. Byte-interleaved mode is useful for video data where a picture element may have two, 8-bit components, an 8-bit intensity value and an 8-bit chroma value.

6.2.4 Data Types

Figure 11:
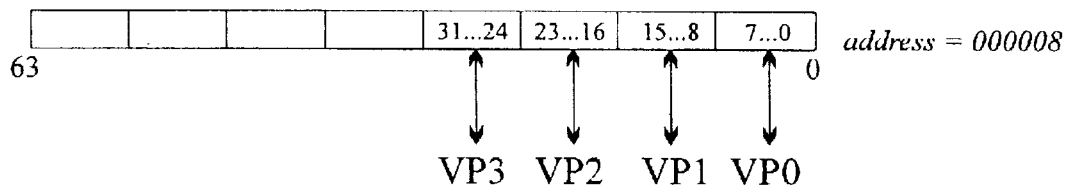
FIG. 11 is a drawing showing the data bits used by the vector processors during byte access of the memory by the preferred embodiment of the Parallel DSP Chip according to this invention.
Figure 11:
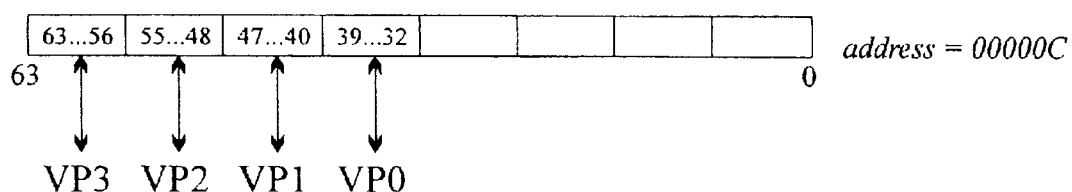
Figure 12:
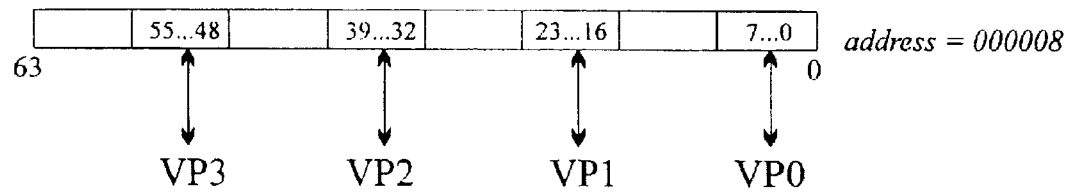
FIG. 12 is a drawing showing the data bits used by the vector processors during interleaved access of the memory by the preferred embodiment of the Parallel DSP Chip according to this invention.
Figure 12:
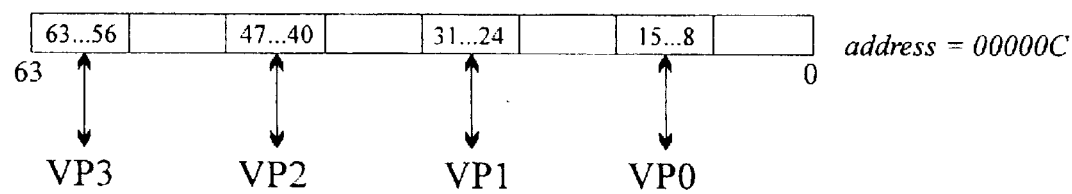

The data types supported by the Parallel DSP Chip and Enhanced C Compiler are:

- Basic Instructions - 4 bytes
- Extended Instructions - 8 bytes
- Vector Data - 3 types:
    - quad_short, 4 sets of 2 bytes, located in bits 15 . . . 0 for VP0, bits 31 . . . 16 for VP1,
      bits 47 . . . 32 for VP2, and bits 63 . . . 48 for VP3.
      The 64 bits of data must be located on
      an 8-byte boundary.
    - _quad_char in non-byte-interleaved mode, 4 bytes located in bits 7 . . . 0 for VP0, bits 15 . . . 8 for VP1,
      bits 23 . . . 16 for VP2, and bits 31 . . . 24 for VP3.
      The 32 bits of data
      must be located on a 4-byte boundary. FIG. 11
      illustrates this bit usage. The msb of
      each byte is sign extended on a memory access to form
      a 16-bit quantity when the
      sign extend ('se') bit is set in the scalar status register,
      and cleared otherwise.
    - _quad_char in byte-interleaved mode. In a 64-bit word
      on an 8-byte boundary, each
      Vector Processor has a 16-bit field and can access data
      from the low order byte or
      the high order byte of its respective field. The choice
      of byte is determined by the
      address, with a value of "0" in the three lsbs of the address
      giving the low order bytes
      and an value of "4" in the three lsbs of the address
      giving the high order byte. FIG.
      12 illustrates bit usage in byte-interleave mode.
      Byte-interleave mode is set using the
      'vi' bit in the Scalar Processor Status Register.
- Scalar Data - 3 types:
    - 3 bytes, located in bits 23 . . . 0 of a 4-byte word on a
      4-byte boundary that is accessed
      via the Instruction Cache; bits 31 . . . 24 are ignored on read
      and sign-extended from bit
      23 on write.
    - 2 bytes on a 2-byte boundary that is accessed via
      the Data Cache; on read, is sign
      extended from bit 15 of the word; on write,
      bits 23 . . . 16 are truncated.
    - 2 bytes, located on a 2-byte boundary that is accessed
      via the Instruction Cache. The
      8 msbs of a 24-bit scalar word are truncated on writes
      to memory. Bit 15 of a 16-bit
      word is sign extended on reads from memory to
      form a 24-bit scalar word.

In the context of the Enhanced C Compiler disclosed herein, the Parallel DSP Chip supports the following data types:

| variable type | keyword | bits |
| --- | --- | --- |
| short integer | short | 16 |
| integer | int | 24 |
| structure | _quad_char | 4, 8-bit vector values |
| structure | _quad_short | 4, 16-bit vector values |

6.2.5 Register Windows

I use Register Windows in the Vector Processors, where one is likely to want large numbers of registers, to provide a large number of registers while reducing the number of bits in the Instruction Word to address the Register Banks in the Vector Processors. The Scalar Processor does not use Register Windows. Both the Vector Processor A Address and the Vector Processor B Address are mapped, and they are mapped the same. The Processor Status Word in the Scalar Processor contains the Register Window Base that controls the mapping.

The size of the Register Window is 32 registers. Sixteen of these are fixed, i.e., do not depend upon the value of the Register Window Base. The remaining sixteen are variable and depend upon the value of the Register Window Base. The window can be moved in increments of eight registers to provide overlap, if desired, between the registers in successive window positions.

Figure 13:
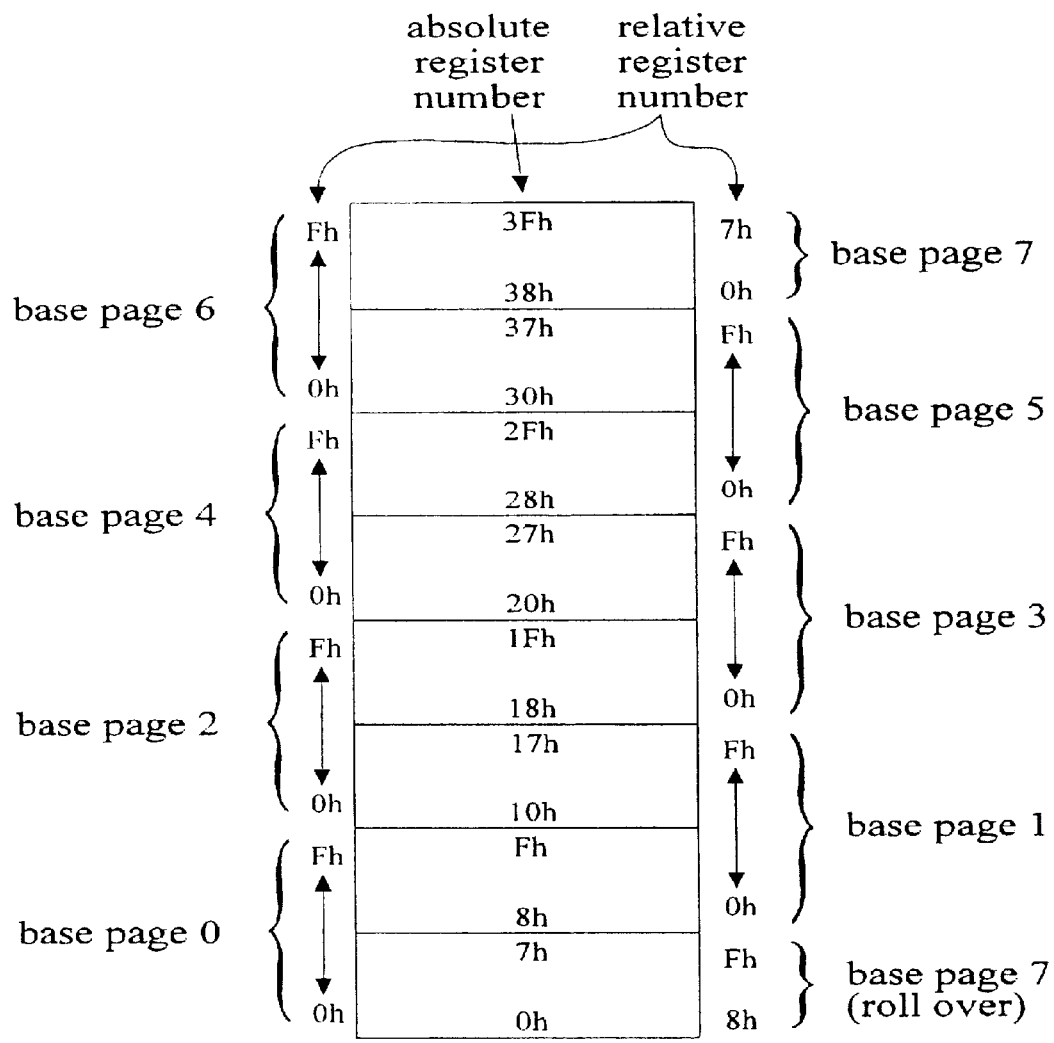
FIG. 13 is a drawing showing the access to groups of registers in the vector processors by the vector processors in the preferred embodiment of the Parallel DSP Chip according to this invention.

FIG. 13 shows the assignments of register window bases and their associated vector registers. For example, Register Window Base Page 0 selects absolute vector registers 0h to Fh and Register Window Base Page 1 selects absolute vector registers 8h to 17h.

Vector Register Address Generation

The Effective Register Address is formed in the Instruction Unit as follows:

Effective Register Address bits 2 . . . 0 = Instruction
Word Register Address bits 2 . . . 0
IF Instruction Word Register Address bit 4 = 0 THEN
(get fixed page of 16 registers)
Effective Register Address bits 5 . . . 3 = Fixed Page Address
ELSE
    (get variable page in increments of 8 registers)
    IF Instruction Word Register Address bit 3 = 0 THEN
      Effective Register Address bits 5 . . . 3 = Register Window Base
ELSE
    Effective Register Address bits 5 . . . 3 = Register Window Base + 1
END IF
END IF

6.2.6 Lower and Extended Scalar Registers

The programming model of the Scalar Processor has 32, 24-bit registers, some of which are general purpose and some of which are special purpose, like the Program Counter. These are commonly referred to as scalar registers, but more precisely are the lower scalar registers. An additional set of up to 32 registers, the extended scalar registers, are infrequently used and hidden. However, the user has access to these registers using an extended opcode modifier. The extended scalar registers control the ports in the Parallel DSP Chip and provide performance monitoring and other reporting functions.

Figure 14:
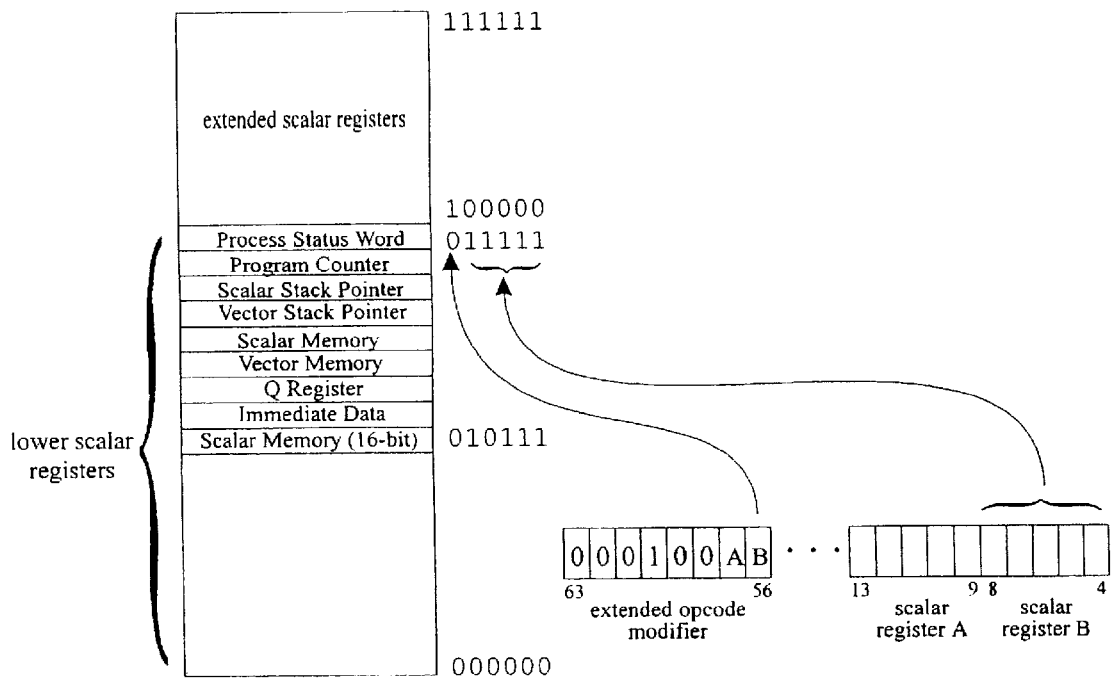
FIG. 14 is a drawing showing the usage of bits in the instruction word for accessing extended registers by the Scalar Processor in the preferred embodiment of the Parallel DSP Chip according to this invention.

FIG. 14 illustrates the range of scalar register addresses and shows how the scalar register B instruction bits 56 and 8 . . . 4 are used to form the scalar register address. As illustrated, when an extended instruction is executed, one extra bit is available for accessing the extended registers, enabling all scalar registers to be accessed. Only the lower scalar registers are available in Basic Instructions. FIG. 14 only shows the mapping for scalar register B. Scalar register A is mapped similarly using bits 57 and 13 . . . 9 of an Extended Instruction.

6.2.7 Format of the Basic Instruction Word

Opcode Modifier

The opcode modifier field is 4 bits and is designated with bits 31 . . . 28 of a Basic Instruction. Unless specified, the Vector Processors default to memory accesses with 16-bit quantities, opcode 4h. The "h" refers to hexadecimal format.

The values of the opcode modifier field are:

0h—Vector ALU operation (memory access bytes)
1h—Vector ALU operation with saturation (memory access bytes)
2h—Vector ALU operation/Scalar result to Q (memory access bytes)
3h—Vector Multiply (memory access bytes)
4h—Vector ALU operation
5h—Vector ALU operation with saturation 6h—Vector ALU operation/Scalar result to Q
7h—Vector Multiply
8h—NOP
9h—Software interrupt
Ah—Stack or Cache Operation
Bh—Vector Test and Set
Ch—Condition code program control
Dh—Scalar Shift or Rotate
Eh—RESERVED
Fh—Extend (enable 64-bit instruction)

Vector Processor Control

The vector processor control field is 14 bits and is contained in bits 27 . . . 14 of the Basic Instruction. These bits are common for all Vector Processors (VP3 to VP0). The vector processor control field is subdivided into vector register A, vector register B, and vector opcode fields.

Vector Register A
Register Read Address (Register A, 5 bits, bits 27 . . . 23):

Fh . . . 0h: fixed page vector registers
0h: VP(n) register 0
1h: VP(n) register 1
2h: VP(n) register 2
3h: VP(n) register 3
4h: VP(n) memoiy read (rotate 0 processors)
5h: VP(n + 1) memory read (rotate 1 processors)
6h: VP(n + 2) memory read (rotate 2 processors)
7h: VP(n + 3) memory read (rotate 3 processors)
8h: VP(n) memory read (broadcast from VP0)
9h: VP(n + 1) memory read (broadcast from VP1)
Ah: VP(n + 2) memory read (broadcast from VP2)
Bh: VP(n + 3) memory read (broadcast from VP3)
Ch: VP(n) multiplier/accumulator b15 . . . 0
Dh: VP(n) multiplier/accumulator b31 . . . 16
Eh: VP(n) multiplier/accumulator b39 . . . 32, with sign extend of bit 7
Fh: VP(n) PSW: Carry, Negative, Zero, Overflow, Enable
1Fh . . . 10h: register within current window Vector Register B
Register Read/Write Address
(Register B, 5 bits, bits 22 . . . 18), except: as noted:

Fh . . . 0h: fixed page vector registers
0h: VP(n) register 0
1h: VP(n) register 1
2h: VP(n) register 2
3h: VP(n) register 3
4h: VP(n) memory write (rotate 0 processors)
5h: VP(n + 1) memory write (rotate 1 processors)
6h: VP(n + 2) memory write (rotate 2 processors)
7h: VP(n + 3) memory write (rotate 3 processors)
8h: VP(n) memory write (broadcast from VP0)
9h: VP(n + 1) memory write (broadcast from VP1)
Ah: VP(n + 2) memory write (broadcast from VP2)
Bh: VP(n + 3) memory write (broadcast from VP3)
Ch: VP(n) multiplier/accumulator b15 . . . 0 (write only)
Dh: VP(n) multiplier/accumulator b31 . . . 16 (write only)
Eh: VP(n) multiplier/accumulator b39 . . . 32 (write only)
Fh: VP(n) PSW: Carry, Negative, Zero, Overflow, Enable
1Fh . . . 10h: register within current window Vector Opcode The vector opcode field controls the operation of the Vector Processors. This field is modified with the opcode modifier field to select an operation. When the opcode modifier specifies an ALU operation, the opcode field is assigned ALU operation bits. OR, when the opcode modifier specifies a multiply operation, the opcode field is assigned multiply operation bits. OR, if the opcode modifier specifies a condition code test, then the opcode field is assigned a test condition. OR lastly, when the opcode modifier specifies a scalar shift or rotate instruction, the opcode field is assigned a scalar opcode modifier. The vector opcode select bits for each of these cases are listed subsequently.

Vector Opcode (4 bits, bits 17 . . . 14): ALU Operation OR Multiply Operation OR Test Condition OR Scalar Opcode Modifier ALU Operations Supported All A and B references are to variables in Vector Processor N, VP(n), for N=0 to 3.

| | |
|---|---|
| 0h: A plus B plus Carry FF | 8h: A plus B |
| 1h: B plus not-A plus Carry FF | 9h: B minus A |
| 2h: A plus not-B plus Carry FF | Ah: A minus B |
| 3h: A or B | Bh: A |
| 4h: A and B | Ch: A plus Carry FF |
| 5h: not-A and B | Dh: not-A |
| 6h: A xor B | Eh: 0 |
| 7h: A xnor B | Fh: all 1's |

Multiply Operations Supported

When Vector Multiply byte or Vector Multiply word is executed, the 4-bit field controls the multiply operation. The ALU is not used during multiply operations. The multiply options include:

0h: Multiply (A times B)
1h: Multiply/Add (A times B plus accumulator)
2h: Multiply/Subtract (A times B niinus accumulator)
3h: Clear Accumulator Test Conditions Supported When Vector Test and Set is executed, the vector test conditions apply. The ALU operation field is interpreted as one of the following test. The test conditions only apply to the vector processors which are currently enabled. If a vector processor is disabled then the instruction is not executed by the processor and the current state is maintained. Tests 7h and Fh are unconditionally executed regardless of whether a vector processor is enabled or disabled.

| condition code | | result | | inverse result |
|---|---|---|---|---|
| zero | 0h: | = | 8h: | not = |
| negative XOR overflow | 1h: | < | 9h: | >= |
| (negative XOR overflow) OR zero | 2h: | <= | Ah: | > |
| negative | 3h: | <0 | Bh: | >= 0 |
| negative OR zero | 4h: | <= 0 | Ch: | >0 |
| carry | 5h: | >= | Dh: | < |
| not(carry) OR zero | 6h: | <= | Eh: | > |
| | 7h: | enable all vector processors | Fh: | disable all vector processors |

Test conditions 1h, 2h, 9h, and Ah are for signed integer comparisons. Test conditions 5h, 6h, Dh, and Eh are for unsigned integer comparisons.

Scalar Opcode Modifiers Supported

When the Scalar Processor is executing a shift or rotate instruction, the Vector Processors are inactive, thus the vector opcode is used as a scalar opcode modifier. The various shift and rotate operations are listed below.

| Scalar Processor Control |
| --- |
| 0h: Arithmetic Shift Right |
| 1h: Logical Shift Right |
| 2h: Rotate Left |
| 3h: Rotate Right |
| 4h: Double Precision Rotate Left |
| 5h: Double Precision Rotate Right |

The scalar processor control field is 14 bits and is designated with bits 13 . . . 0 of the Basic Instruction. The scalar processor control field is subdivided into scalar register A, scalar register B. and scalar opcode fields.

| Scalar Register A |
| --- |
| Register Read Address(Register A, 5 bits, bits 13 . . . 9): |
| 16h . . . 0h: Scalar Registers |
| 17h: Scalar Memory (16-bit) |
| 18h: Immediate Operand from Instruction Register |
| 19h: Q Register |
| 1Ah: Vector Memory |
| 1Bh: Scalar Memory |
| 1Ch: Vector Stack Pointer |
| 1Dh: Scalar Stack Pointer |
| 1Eh: Program Counter |
| 1Fh: PSW (Processor Status Word) |

| Scalar Register B |
| --- |
| Register Read/Write Address(Register B, 5 bits, bits 8 . . . 4): |
| 16h . . . 0h: Scalar Registers |
| 17h: Scalar Memory (16-bit) |
| 18h: Immediate Operand from Instruction Register (read only) |
| 19h: Q Register |
| 1Ah: Vector Memory |
| 1Bh: Scalar Memory |
| 1Ch: Vector Stack Pointer |
| 1Dh: Scalar Stack Pointer |
| 1Eh: Program Counter |
| 1Fh: PSW (Processor Status Word) |

Figure 15:
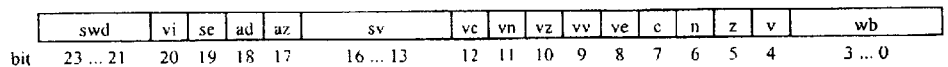
FIG. 15 is a drawing showing the usage of bits in the processor status word by the preferred embodiment of the Parallel DSP Chip according to this invention.

The bit usage of the 24-bit Processor Status Word (PSW) for the Scalar Processor is shown in FIG. 15, using the following labels for the bits:

| |
| --- |
| swd: software interrupt data (multiple bits) |
| vi: interleave vector byte accesses |
| se: sign extend vector bytes |
| ad: all vector processors disabled |
| az: all vector processors zero |
| sv: select vector processor (multiple bits) |
| vc: selected vector processor carry bit |
| vn: selected vector processor negative bit |
| vz: selected vector processor zero bit |
| vv: selected vector processor overflow bit |
| ve: selected vector processor enable bit |
| c: scalar processor carry bit |
| n: scalar processor negative bit |
| z: scalar processor zero bit |
| v: scalar processor overflow bit |
| wb: register window base (multiple bits) |

Scalar Opcode

The scalar opcode field controls the operation of the Scalar Processor. This field is modified with the opcode modifier field to select an operation. When the opcode modifier specifies an ALU operation, the opcode field is assigned ALU operation bits. When the opcode modifier specifies a stack or cache operation, the opcode field is assigned stack or cache operation bits. The scalar opcode select bits are listed below.

Scalar Opcode (4 bits, bits 3 . . . 0): ALU Operation OR Stack-or-Cache Operation ALU Operations Supported All references are to variables in the Scalar Processor.

| | |
| --- | --- |
| 0h: A plus B plus Carry FF | 8h: A plus B |
| 1h: D plus not-A plus Carry FF | 9h: B minus A |
| 2h: A plus not-B plus Carry FF | Ah: A minus B |
| 3h: A or B | Bh: A |
| 4h: A and B | Ch: A plus Carry FF |
| 5h: not-A and D | Dh: not-A |
| 6h: A xor B | Eh: 0 |
| 7h: A xnor B | Fh: all 1's |

Stack or Cache Operations Supported

| | |
| --- | --- |
| 0h: | Return - return from interrupt unconditionally |
| 1h: | Scalar Push and Decrement - push contents of scalar register to scalar stack and decrement the scalar stack pointer |
| 2h: | Scalar Pop and Increment- pop data from scalar stack, place in scalar register, and increment the scalar stack pointer |
| 3h: | Vector Push - push contents of vector register to vector stack |
| 4h: | Vector Pop - pop data from vector stack and place in vector register |
| 5h: | Vector Push and Decrement - push contents of vector register to vector stack and decrement vector stack pointer |
| 6h: | Vector Pop and Increment - pop data from vector stack, place in vector register, and increment vector stack pointer |
| 7h: | Scalar stack pointer decrement |
| 8h: | Scalar stack pointer increment |
| 9h: | Vector stack pointer decrement |
| Ah: | Vector stack pointer increment |
| Bh: | Vector flush - flush a page from the vector memory |
| Ch: | Scalar flush - flush a page from the scalar memory |

6.2.8 Format of the Extended Instruction Word

Extended Instructions must be placed on 8-byte boundaries. A nop or other Basic Instruction may be required to pad a collection of Basic Instructions to align to 8-byte boundaries.

All Vector Processor memory accesses are 16-bits for Extended Instructions. Memory accesses as bytes are only available with Basic Instructions. Additionally, any vector memory references by the Vector Processors are not possible with Extended Instructions which perform condition code relational operations. This is due to the fact that the Scalar Processor can not calculate an address and perform a conditional evaluation in the same cycle.

The Extended Instruction is formed as follows:

Extended Instruction Bits 31 . . . 0

Opcode Modifier (4 bits, bits 31 . . . 28)

Extend (enable 64-bit instructions)

Vector Processor Control (14 bits, bits 27 . . . 14, common for VP3 . . . VP0)

Same as for Basic Instructions.

Scalar Processor Control (14 bits, bits 13 . . . 0)

Same as for Basic Instructions.

Extended Instruction Bits 63 . . . 32

Extended Opcode Modifier (8 bits, bits 63 . . . 56)

0Mh—Extended scalar register select (hidden control registers)
1Nh—Call on Condition Code
2Nh—Jump on Condition Code
3Nh—Return on Condition Code
40h . . . 43h—Cache lock and unlock requests
44h . . . FFh—RESERVED
   where M=4 bit field in which bit 0 will select scalar upper register B and bit 1 will select scalar upper register A. If a bit is set then the scalar register field will select from an upper register. If the bit is cleared then the scalar register field will select from the lower registers. Bits 2 and 3 are not used.
   where N=0h . . . Fh and represents the 4-bit test condition field.

When an extended instruction that operates on a condition code is executed, a 4-bit test condition is used. The test is made with the Scalar Processor status bits. The test conditions are listed below. Unsigned less than or equal to (<=) and greater than (>) can be implemented by reversing the order of subtraction, and using unsigned >= and <condition codes respectively.

| condition code | | result | | inverse result |
|---|---|---|---|---|
| zero | 0h: | = | 8h: | not = |
| negative XOR overflow | 1h: | < | 9h: | >= |
| (negative XOR overflow) OR zero | 2h: | <= | Ah: | > |
| negative | 3h: | <0 | Bh: | >= 0 |
| negative OR zero | 4h: | <= 0 | Ch: | >0 |
| carry | 5h: | >= | Dh: | < |
| | 6h: | always | Eh: | never |
| | 7h: | all active vector processors = zero | Fh: | all vector processors disabled |

Test conditions 1h, 2h, 9h, and Ah are for signed integer comparisons.
Test conditions 5h and Dh are for unsigned integer comparisons.

Immediate Data (24 bits, bits 55 . . . 32)
The Immediate Data may be any value.
6.3 Enhanced Compiler In my Parallel DSP Chip and Enhanced C Compiler described herein, a new method of programming a parallel processor is being disclosed. This method takes advantage of the tight coupling between the operation of all of the Vector Processors 110 to 113 and Scalar Processor 107 that is provided by my instruction set that is executed by the Instruction Unit 105, and my use of the Scalar Processor to compute memory addresses where each address is used in common by all of the Vector Processors to access a group of four variables in memory.

Since there are four Vector Processors in the Parallel DSP Chip (although this concept can be extended to other degrees of parallelism, with corresponding changes in the naming of the data structures), I say that the Vector Processors operate upon a simple data structure that I call a Quad. The base or starting address of this four-element data structure is pointed to by a memory address created by the Scalar Processor. One can then build arrays of such data structures to represent more complicated data sets, such as the 2-D array of rows and columns of pixels that represent a frame or field of video data. My compiler, should it read the four variables in a Quad from memory and temporarily store them in registers in the Vector Processors, still allows the variables to be referenced as a Quad even though no memory addresses are required to access the registers, and generates instructions with the proper register addresses. Within a Quad, any number and any combination of elements can be operated upon by the Vector Processors since each of the Vector Processors can be temporarily disabled under program control.

Two types of Quads are supported by the Parallel DSP Chip. A _quad_char represents four, 8-bit variables for use by the four Vector Processors in parallel, and a _quad_short represents four, 16-bit variables for use by the four Vector Processors in parallel. The underscore characters (_) have been used for convenience to distinguish the names of types of data structures that are directly supported by the compiler from the names that a user might devise.

For example, suppose one has two sets of four, 16-bit variables that one wants processed by the Vector Processors. These variables can be represented by two variables that have been declared to be _quad_shorts. Further suppose that one first wants the Vector Processors to perform the following operations in parallel ("h" represents hexadecimal notation):

Vector Processor 0: (data at Address1+0h) times is own Register 1–> its own Register 1 Vector Processor 1: (data at Address1+2h) times is own Register 1–> its own Register 1 Vector Processor 2: (data at Address1+4h) times is own Register 1–> its own Register 1

Vector Processor 3: (data at Address1+6h) times is own Register 1–> its own Register 1

And then suppose that one wants the Vector Processors to perform the following operations in tandem:

Vector Processor 0: (data at Address1+8h) times is own Register 2–> its own Register 2

Vector Processor 1: (data at Address1+Ah) times is own Register 2–> its own Register 2

Vector Processor 2: (data at Address1+Ch) times is own Register 2–> its own Register 2

Vector Processor 3: (data at Address1+Eh) times is own Register 2–> its own Register 2

For the first set of operations, the Scalar Processor 107 generates a memory address of Address1. Then, assuming the two _quad_shorts occupy successive locations in memory, in which case the base addresses of the two _quad_shorts are 8 bytes apart, the Scalar Processor generates a memory address of (Address1+8). For efficiency, these address calculations and memory references are performed in a pipelined manner so that a memory reference can occur on every CPU cycle, but I will ignore that detail at the moment since it does not affect the programming model of the Parallel DSP Chip.

Any number of _quad_shorts can be processed in series in this manner, simply advancing the memory address computed by the Scalar Processor from one _quad_short to the next. Since a _quad_char and _quad_short can represent any sort of data, not just numeric data that is a part of a vector, any sort of processing of any sort of data can be visualize easily by the programmer. I have called the four parallel processing elements Vector Processors for lack of a better name; they are not restricted to the processing of vectors in matrix algebra.

Thus rather than having a compiler try to deduce the parallelism inherent in a program that is written as a scalar process that operates upon one pair of variables at a time, I give clues to my Enhanced C Compiler as to where the variables are to be processed in my Parallel DSP Chip. These clues are given by the declaration of the variables as certain supported data types. Thus the programmer's choice of data type tells the compiler where to process the data. Scalar variables are operated upon by the Scalar Processor 107 and Quad variables are operated upon by the Vector Processors 110 to 113. And, by the use of these data types, the program can be written as a scalar process that operates upon as many as five pairs of variables at a time, one pair of scalar variables and four pairs of vector variables, with the knowledge that processing of all of these variables will proceed in parallel for maximum control of the hardware and maximum performance. In addition, the use of these data types and the knowledge of how they will be processed by the hardware helps the programmer to place data in memory for maximum performance.

Since the declaration of data types can be machine-dependent in C, and the use of C is widespread among many programmers, suppose the following data types are defined in my Enhanced C Compiler:

quad_char—four, 8-bit integers for processing by the four Vector Processors in parallel quad_short—four, 16-bit integers for processing by the four Vector Processors in parallel long—single, 24-bit integer for processing by the Scalar Processor The programmer defines each of his variables as being one of these three types. Then, the code is written in terms of the processing of these data types. If variables with the long type are used, it is understood by both the programmer and the Compiler that the Scalar Processor is to be used to perform operations upon individual 24-bit quantities. If variables with the _quad_char type are used, it is understood by both the programmer and my Compiler that the Vector Processors are to be used to perform operations upon sets of four, 8-bit quantities. Likewise, if variables with the _quad_short type are used, it is understood by both the programmer and my Compiler that the Vector Processors are to be used to perform operations upon sets of four, 16-bit quantities. Thus the programmer has explicit control over the parallel operation of the machine without having to resort to subroutine calls to perform parallel operations or the writing of four-step loops that are interpreted by the Compiler as representing the operation of the Vector Processors.

Naturally, this concept can be extended to machines having other than four Vector Processors and other than 8- and 16-bit quantities, and to other types of compilers than C compilers.

Here is an example of the use of Quad structures, with all variables declared:

$$\begin{vmatrix} 1 & 2 & 3 & 4 \\ 5 & 6 & 7 & 8 \\ 9 & 10 & 11 & 12 \\ 13 & 14 & 15 & 16 \end{vmatrix} \times \begin{vmatrix} 100 \\ 200 \\ 300 \\ 400 \end{vmatrix} = \begin{vmatrix} Result[0] \\ Result[1] \\ Result[2] \\ Result[3] \end{vmatrix}$$

*/ void main()  /* start of main program */
{

/*

This declaration sets up the matrix and vector columns. The set of four elements, E0, E1, E2, and E3, within the innermost {} is a variable having the type _quad_short, where E0 is processed by Vector Processor 0, E1 is processed by Vector Processor 1, and so on.

Vector Processor 0 handles the first row of the matrix, Vector Processor 1 handles the second row of the matrix, and so on. Since the processing of each row of the matrix requires access to the entire vector, the vector is replicated four times in VecCol[], once for each of the four Vector Processors.

```
_quad_short VecCol[4] =
{{100,100,100,100},{200,200,200,200},{300,300,300,300},
{400,400,400,400}};
_quad_short MatCol[4] =
{{1,5,9,13},{2,6,10,14},{3,7,11,15},{4,8,12,16}};
_quad_short Result = {0,0,0,0};
int x;
/* loop variable to sequence through the four columns of the matrix
*/
/*
```

This code segment multiplies each column of the matrix by each row of the vector in turn, accumulating the products as you go to arrive at the final vector, Result.

```
*/
    for (x = 0; x <= 3; x++)
    {
        Result = Result + (MatCol[x] * VecCol[x]);
    }
}
**********End of example**********
```

I claim:

1. A data processing device comprising multiple, like processing elements and a controlling processing element, where all of the processing elements are controlled from a single instruction word having multiple groups of bits, with one group of the bits controlling all of the multiple, like processing elements in parallel and another group of the bits controlling the controlling processing element, wherein said controlling processing element generates a memory address during a first portion of an execution cycle of said single instruction word, and wherein during a second portion of said execution cycle of said single instruction word, individual ones of said multiple, like processing elements operate on individual ones of multiple datum that are referenced using said memory address.

2. A data processing device as claimed in claim 1, where the data processing device is coupled to a random access memory means and the controlling processing element includes means to compute said memory address used to address said multiple datum in the random access memory means simultaneously, and the multiple datum are accessed simultaneously by the multiple, like processing elements.

3. A data processing device as claimed in claim 1, where multiple ones of the data processing devices can be connected together and data passed amongst the connected together data processing devices.

4. A data processing device as claimed in claim 1, and further comprising a cache memory coupled to a random access memory means, where data is fetched from the random access memory means in a block and stored in the cache memory incrementally, as portions of the block are received by the cache memory, and wherein at least one of the processing elements can use the data stored in the cache memory immediately after it is received by the cache memory, before the entire block of data has been fetched from the random access memory means and stored in the cache memory.

5. A data processing device as claimed in claim 1, where the data processing device is comprised of an arithmetic unit for generating said memory address by providing an increment or a decrement to a previous memory address, wherein during execution of a current instruction an input to said arithmetic unit is used to provide said memory address for said multiple, like processing elements, and an incremented or a decremented output of said arithmetic unit is stored for use during execution of a next instruction as the input to said arithmetic unit.

6. A data processing device as claimed in claim 5, wherein the amount of the increment or the decrement is specified in the current instruction.

7. A data processing device as claimed in claim 1, where the group of the bits that controls all of the multiple, like processing elements in parallel is comprised of a set of bits for specifying to said multiple, like processing elements in parallel how to interpret data referenced by said memory address.

8. A data processing device as claimed in claim 1, where during the second portion of said execution cycle of said single instruction word, when said individual ones of said multiple, like processing elements operate on individual ones of said multiple datum that are referenced using said memory address, said controlling processing element generates and stores a next memory address for use during the execution cycle of a next single instruction word.

9. A method for representing the like processing of multiple like datum simultaneously, where a data structure comprising a group of like datum is referenced by a single address pointer, where the multiple like datum in the data structure are processed simultaneously by a group of multiple, like processing elements, and the address pointer is computed by a controlling processing element, and where said group of multiple, like processing elements, and said controlling processing element are all directed by a single instruction word.

10. A method for operating a digital data processor, comprising the steps of:
composing individual ones of a plurality of instructions and storing the plurality of instructions in a memory that is coupled to a digital data processor, the digital data processor comprising a first processing element and a plurality of second processing elements;
accessing an instruction from the memory;
applying the accessed instruction to the digital data processor;
controlling an operation of the first processing element of the digital data processor with at least one first portion of the accessed instruction; and
simultaneously controlling an operation of the plurality of second processing elements of the digital data processor with at least one second portion of the accessed instruction, said at least one second portion providing identical control to the plurality of second processing elements, wherein an operation specified for the first processing element is calculating a memory address for referencing multiple memory locations whose contents are used or updated by the plurality of second processing elements.

11. A method as set forth in claim 10, wherein the step of controlling the operation of the first processing element controls an arithmetic logic unit (ALU) of the first processing element for performing an operation specified by the accessed instruction, and wherein the step of simultaneously controlling the operation of the plurality of second processing elements controls one of a multiplier/accumulator or an ALU of each of the plurality of second processing elements for performing the operation specified by the accessed instruction.

12. A method as set forth in claim 10, and further comprising an initial step of:
defining at least one set of n, m-bit variables, the m-bit variables being stored in a variable memory in logically ascending memory address locations;
wherein there are n second processing elements, and wherein the step of simultaneously controlling comprises steps of,
reading the n, m-bit variables from the variable memory beginning with a first address; and
operating on individual ones of the m-bit variables with the n second processing elements in parallel to perform an operation specified by an instruction.

13. A method as set forth in claim 12, wherein the n second data processors are each simultaneously controlled by a same first plurality of instruction word fields of the accessed instruction.

14. A method as set forth in claim 13, wherein during the execution of the step of operating the method includes a step of initiating the calculation of a second address for reading a second set of n, m-bit variables from the variable memory beginning with the second address.

15. A method as set forth in claim 14, wherein the step of calculating is executed in accordance with a second plurality of instruction word fields of the accessed instruction.

16. A method for operating a digital data processor, comprising the steps of:
accessing a first instruction from a memory that is coupled to a digital data processor, the digital data processor comprising a first processing element and a plurality of second processing elements, the first instruction being comprised of a plurality of fields;
applying the accessed first instruction to the digital data processor;
controlling an operation of the first processing element of the digital data processor with m first fields of the accessed instruction, where m is a positive integer that is greater than or equal to one; and
simultaneously controlling during the execution of the first instruction an operation of each of the plurality of second processing elements of the digital data processor with n second fields of the accessed instruction, where n is greater than or equal to one, said n second fields providing identical control to the plurality of second processing elements.

17. A method as set forth in claim 16, wherein m and n are both equal to three.

18. A method as set forth in claim 16 wherein each of the first processing element and the plurality of second processing elements is comprised of an addressable register bank for storing operands, wherein each of the first processing element and the plurality of second processing elements is comprised of logic means for performing an operation on operands read out from an associated one of the register banks, wherein the m first fields of the instruction control the first processing element by specifying a first register within the register bank, a second register within the register bank, and an operation to be performed by the logic means on operands read out from the specified first and second registers, and wherein the n second fields of the instruction control each of the plurality of second processing elements by specifying, for each of the plurality of second processing elements, a first register within the register bank, a second register within the register bank, and an operation to be performed by the logic means on operands read out from the specified first and second registers.

19. A method as set forth in claim 18, wherein the logic means of the first processing element is comprised of an arithmetic logic unit (ALU) for performing a specified operation on at least one operand read out from the specified first and second registers, and wherein the logic means of each of the plurality of second processing elements is comprised of an ALU and a multiplier/accumulator for performing a specified operation on at least one operand read out from the specified first and second registers.

20. A method as set forth in claim 19, wherein the specified operation is executed at a rate of one per clock cycle.

21. A digital data processor comprising a plurality of functionally identical first processor elements and a second processor element, wherein an operation of each of the plurality of first processor elements and an operation of the second processor element are locked together during an execution of a single instruction word, the single instruction word specifying in a first portion thereof, that is coupled in common to each of the plurality of first processor elements, the operation of each of the plurality of first processor elements in parallel, and in a second portion thereof the operation of the second processor element, wherein the second processing element generates a memory address during a first portion of an execution cycle of the single instruction word, and wherein during a second portion of the execution cycle of the single instruction word, individual ones of the first processing elements operate on individual ones of multiple datum that are referenced using said memory address.

22. A digital data processor as in claim 21, wherein a first type of instruction word has a length of n bits for specifying basic instructions, and a second type of instruction word has a length of 2n bits for specifying extended instructions.

23. A digital data processor as in claim 22, wherein a definition of bit fields in n least significant bits of the extended instructions is identical to the definition of bit fields in the basic instructions.

24. A digital data processor as in claim 21, wherein the first portion of the single instruction word is comprised of a first processor element opcode field and a plurality of fields for specifying first processor element registers, wherein the second portion of the single instruction word is comprised of a second processor element opcode field and a plurality of fields for specifying second processor element registers.

25. A digital data processor as in claim 24, and further comprising an instruction unit comprising a second processor element instruction register and a first processor element instruction register, and wherein a third portion of the single instruction word is comprised of an opcode modifier field that is coupled to the instruction unit.

26. A digital data processor as in claim 24, and further comprising an instruction unit comprising a second processor element instruction register and a first processor element instruction register, wherein a third portion of the single instruction word is comprised of a first opcode modifier field that is coupled to the instruction unit, wherein a fourth portion of the single instruction word is comprised of an extended opcode modifier field that is coupled to the execution unit, and wherein a fifth portion of the single instruction word is comprised of an immediate data field that is coupled to the second processor element.

27. A method for operating a digital data processor, comprising steps of:

providing n functionally identical first processing elements and a second processing element, where n is an integer greater than one, wherein an operation of each of the n first processing elements and an operation of the second processing element are locked together during an execution of a single instruction word;

during the execution of a first type of instruction word that specifies a first data type for the n first processing elements, accessing data from a plurality of adjacent memory locations as n sets of two byte data elements, an individual one of the n sets being associated with one of the n first processing elements;

during the execution of a second type of instruction word that specifies a second data type for the n first processing elements, accessing data from a plurality of adjacent memory locations as n sets of one byte data elements, an individual one of the n sets being associated with one of the n first processing elements; and during the execution of a third type of instruction word that specifies a third data type for the n first processing elements, accessing data from a plurality of non-adjacent memory locations as n sets of data elements, an individual one of the n sets being associated with one of the n first processing elements, and further comprising a step of calculating, with the second processing element, an address of the plurality of adjacent or non-adjacent memory locations.

28. A method as in claim 27, wherein during the execution of the first, second, or third type of instruction word, further comprising a step of accessing data from another plurality of memory locations for the second processing element.

29. A method as in claim 27, wherein the accessed data represents elements of a matrix.

* * * * *